United States Patent
Takahashi et al.

(10) Patent No.: US 11,588,369 B2
(45) Date of Patent: Feb. 21, 2023

(54) MOTOR

(71) Applicant: Nidec Corporation, Kyoto (JP)

(72) Inventors: Shunsuke Takahashi, Kyoto (JP); Takayuki Migita, Kyoto (JP); Takumi Okada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 78 days.

(21) Appl. No.: 17/205,074

(22) Filed: Mar. 18, 2021

(65) Prior Publication Data
US 2021/0305875 A1 Sep. 30, 2021

(30) Foreign Application Priority Data
Mar. 31, 2020 (JP) .............................. JP2020-061965

(51) Int. Cl.
*H02K 5/16* (2006.01)
*H02K 5/173* (2006.01)
*H02K 5/22* (2006.01)

(52) U.S. Cl.
CPC ........... *H02K 5/1732* (2013.01); *H02K 5/225* (2013.01)

(58) Field of Classification Search
CPC .............................. H02K 5/1732; H02K 5/225
USPC ...................................................... 310/71, 66
See application file for complete search history.

(56) References Cited

FOREIGN PATENT DOCUMENTS

JP 09-215260 A 8/1997

*Primary Examiner* — Terrance L Kenerly
(74) *Attorney, Agent, or Firm* — Keating & Bennett

(57) ABSTRACT

In manufacturing a motor, a second protrusion of a lead bushing is inserted into a second through-hole in a bearing holder. A diameter increased portion on an upper end of the second protrusion fixes the lead bushing to the bearing holder. This configuration thus requires less dimensional accuracy as compared with a case where the lead bushing is press fitted to the bearing holder.

6 Claims, 16 Drawing Sheets

MOTOR

CROSS REFERENCE TO RELATED APPLICATION

The present application claims priority under 35 U.S.C. § 119 to Japanese Patent Application No. 2020-061965, filed on Mar. 31, 2020, the entire contents of which are hereby incorporated herein by reference.

FIELD OF THE INVENTION

The present invention relates to a motor.

BACKGROUND

It has been known that a conducting wire serving as a coil of a motor is connected to an external circuit board via a metal terminal. The metal terminal is drawn out of a housing through a resin component, such as a lead bushing, fixed to a through-hole in the housing.

A known motor includes such a resin component.

A sealing member made of rubber has been press fitted to a through-hole in a housing of a motor. A lead wire has been drawn out of the housing through the sealing member. In order to press fit the sealing member into the through-hole in the housing, however, it is necessary to subject the through-hole and the sealing member to work with high dimensional accuracy.

SUMMARY

An example embodiment of the present disclosure provides a motor including a stator with a ring shape around a central axis extending up and down, a rotor rotatably supported about the central axis, and a housing accommodating the stator and the rotor. The rotor includes a shaft extending along the central axis, and a rotor main body rotatable about the central axis in conjunction with the shaft. The motor further includes a bearing axially above the rotor main body, the bearing supporting the shaft in a rotatable manner relative to the housing, and a connection terminal electrically connected to a coil of the stator. The housing includes a bearing holder axially partitioning an inner side and an outer side of the housing and holding the bearing, and a lead bushing fixed to the bearing holder. The bearing holder includes a first through-hole and a second through-hole. The lead bushing includes a base located between the bearing holder and at least one of the stator and the rotor main body, a first protrusion protruding axially upward from the base, the first protrusion being in the first through-hole, and a second protrusion protruding axially upward from the base, the second protrusion being in the second through-hole. The connection terminal extends from the inner side of the housing to the axially upper and outer side of the housing through the first protrusion. The second protrusion includes a diameter increased portion extending to the axially upper and outer side of the housing, extending outward from an upper end of the second protrusion, and closing an upper opening of the second through-hole.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings. In this application, the term "axial direction", "axial", or "axially" refers to a direction parallel with a central axis of a motor, the term "radial direction", "radial", or "radially" refers to a direction orthogonal to the central axis of the motor, and the term "circumferential direction", "circumferential", or "circumferentially" refers to a direction along an arc about the central axis of the motor. Also in this application, the term "axial direction" or "axially" refers to a direction extending up and down. Shapes of components and positional relationships among the components are described with a bearing holder located above a rotor main body. However, the definitions "upper" and "lower" do not intend to limit an orientation of a motor according to the present disclosure in manufacturing the motor and in putting the motor to use.

The foregoing direction parallel with the central axis involves a direction substantially parallel with the central axis. The foregoing direction orthogonal to the central axis involves a direction substantially orthogonal to the central axis.

Figure 1:
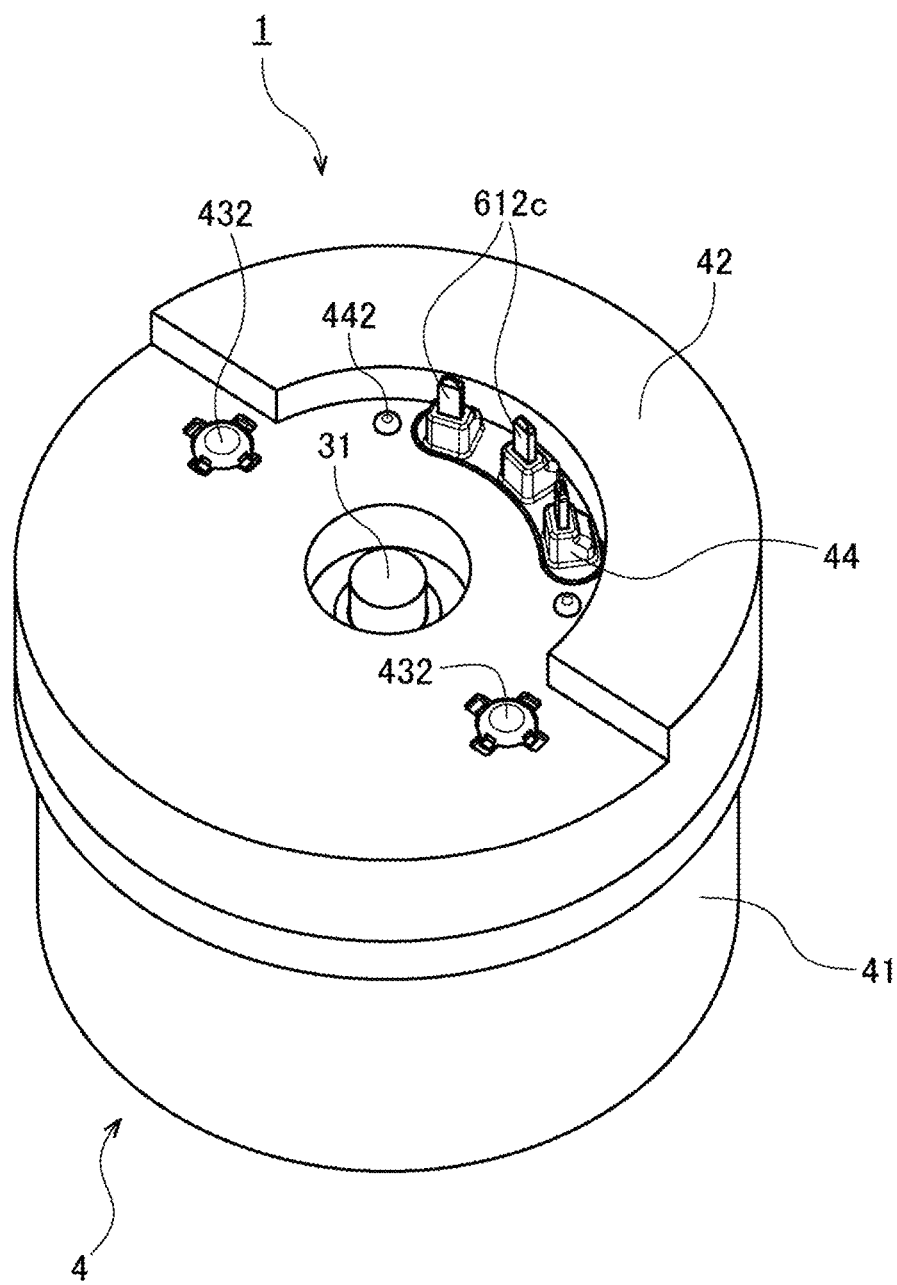
FIG. 1 is a perspective view of an external appearance of a motor according to an example embodiment of the present disclosure.
Figure 2:
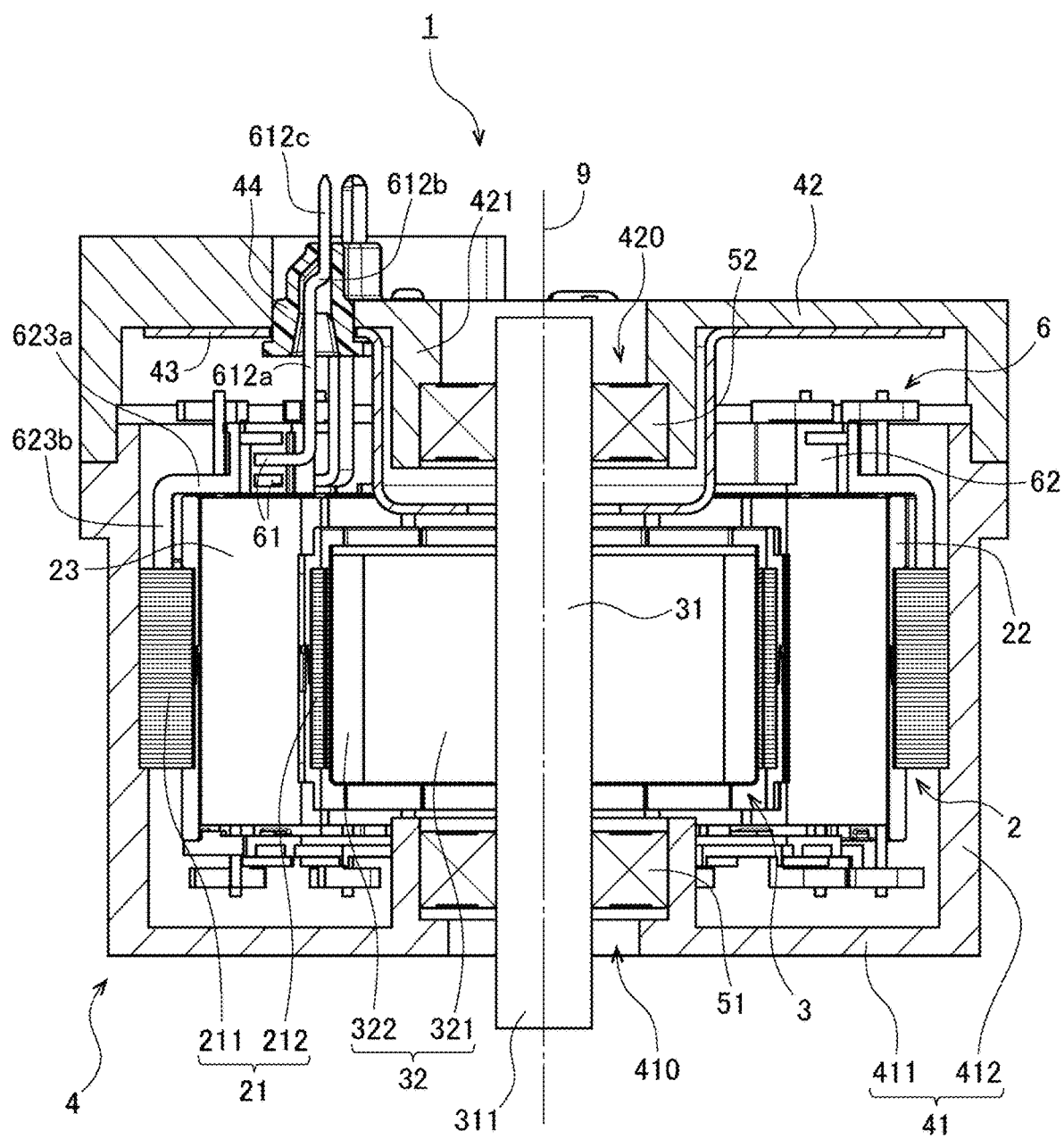
FIG. 2 is a longitudinal sectional view of the motor.

FIG. 1 is a perspective view of an external appearance of a motor 1 according to an example embodiment of the present disclosure. FIG. 2 is a longitudinal sectional view of the motor 1.

The motor 1 is installed in, for example, an automobile, and is used as a drive source for generating a driving force for an electric power steering device. However, the motor according to the present disclosure may be used for any device in addition to a power steering device. For example, the motor according to the present disclosure may be used as a drive source for other parts in an automobile, such as a transmission, a brake system, a traction motor, an engine cooling fan, and an oil pump. Alternatively, the motor according to the present disclosure may be installed in home electronics, OA appliances, medical appliances, and others, to generate a driving force for the various parts.

As illustrated in FIGS. 1 and 2, the motor 1 includes a stator 2, a rotor 3, and a housing 4. The housing 4 is fixed to a frame body of a device to be driven. The stator 2 is fixed to the housing 4. The rotor 3 is supported to be rotatable relative to the stator 2 and the housing 4.

The stator 2 is a ring-shaped unit disposed around a central axis 9. The stator 2 according to the present example embodiment includes a stator core 21, an insulator 22, and a plurality of coils 23.

The stator core 21 includes electromagnetic steel plates axially stacked on top of one another. The stator core 21 includes a core back 211 having an annular ring shape or substantially annular ring about the central axis 9, and a plurality of teeth 212 extending radially inward from the core back 211. The core back 211 is arranged substantially coaxially with the central axis 9. The teeth 212 are arrayed substantially equidistantly in the circumferential direction.

The insulator 22 is made of an insulating resin. The insulator 22 is mounted to the stator core 21. The stator core 21 has a surface at least partially covered with the insulator 22. Of the surface of the stator core 21, specifically, at least upper faces of the teeth 212, lower surfaces of the teeth 212, and circumferentially opposite end faces of the teeth 212 are covered with the insulator 22.

The coils 23 are arranged around the central axis 9. The coils 23 include conducting wires wound around the insulator 22. In the present example embodiment, the conducting wires are wound around the teeth 212 serving as a magnetic core with the insulator 22 interposed between the conducting wires and the teeth 212. The insulator 22 interposed between the teeth 212 and the coils 23 inhibits electrical short circuits between the teeth 212 and the coils 23.

The rotor 3 is a unit that is disposed radially inside the stator 2 and is supported to be rotatable about the central axis 9. The rotor 3 according to the present example embodiment includes a shaft 31 and a rotor main body 32.

The shaft 31 is a pillar-shaped or substantially pillar member that extends along the central axis 9. The shaft 31 is made of, for example, a metal such as stainless steel. The shaft 31 is supported by a lower bearing 51 and an upper bearing 52 (to be described later) to rotate about the central axis 9. The shaft 31 has a lower end 311 that protrudes axially downward of the housing 4. The device to be driven is coupled to the lower end 311 of the shaft 31 via a power transmission mechanism such as a gear.

However, the shaft 31 does not necessarily protrude axially downward of the housing 4. For example, the shaft 31 may have an upper end that protrudes axially upward of the housing 4. In addition, the shaft 31 may be a hollow member.

The rotor main body 32 rotates about the central axis 9 in conjunction with the shaft 31. The rotor main body 32 includes a rotor core 321 and a plurality of rotor magnets 322. The rotor core 321 includes electromagnetic steel plates axially stacked on top of one another. The rotor core 321 has in its center a through-hole that extends axially. The shaft 31 is press fitted to the through-hole in the rotor core 321. The rotor core 321 and the shaft 31 are thus fixed together.

The rotor magnets 322 are disposed on an outer peripheral surface of the rotor core 321 or are located inside the rotor core 321. The rotor magnets 322 have radially outer faces that serve as magnetic pole faces disposed opposite radially inner end faces of the teeth 212. The rotor magnets 322 are arrayed circumferentially such that the north and south poles are alternately arranged.

When the motor 1 is driven, a circuit board (not illustrated) supplies drive current to the coils 23 via conductive members 61 (to be described later). Rotating magnetic fields are thus generated at the teeth 212 of the stator core 21. Circumferential torque is then generated by magnetic attraction and repulsion between the teeth 212 and the rotor magnets 322. As a result, the rotor 3 rotates about the central axis 9 relative to the stator 2 and the housing 4.

The housing 4 is a casing that accommodates therein the stator 2 and the rotor 3. As illustrated in FIGS. 1 and 2, the housing 4 includes a housing main body 41 and a bearing holder 42.

The housing main body 41 is a one end-closed tubular container. The housing main body 41 is made of, for example, a metal such as aluminum or stainless steel. However, the housing 4 may be made of a resin in place of a metal. The housing main body 41 has a bottom plate 411 and a sidewall 412. The bottom plate 411 is located axially below the stator 2. The bottom plate 411 has a disk or substantially disk shape and extends substantially perpendicularly to the central axis 9. The bottom plate 411 has at its center a lower opening 410. The lower opening 410 axially penetrates through the bottom plate 411. The shaft 31 axially extends through the lower opening 410. The sidewall 412 has a cylindrical or substantially cylindrical shape and extends axially upward from a radially outer end of the bottom plate 411. The stator core 21 is fixed to an inner peripheral surface of the sidewall 412.

The bearing holder 42 is a member that serves as an upper face of the housing 4 and axially partitions an inner side and an outer side of the housing 4. The bearing holder 42 is located axially above the stator 2. The bearing holder 42 has a disk or substantially disk shape and extends substantially perpendicularly to the central axis 9. The bearing holder 42 is made of, for example, a metal such as aluminum. The bearing holder 42 has a peripheral edge fixed to an upper end of the sidewall 412 of the housing main body 41. The bearing holder 42 has at its center an upper opening 420. The upper opening 420 axially penetrates through the bearing holder 42. The shaft 31 has an upper end located in the upper opening 420.

The motor 1 also includes the lower bearing 51 and the upper bearing 52. The lower bearing 51 is disposed between the housing main body 41 and the shaft 31. The lower bearing 51 is located axially below the rotor main body 32. The upper bearing 52 is disposed between the bearing holder 42 and the shaft 31. The upper bearing 52 is located axially above the rotor main body 32.

Each of the lower bearing 51 and the upper bearing 52 is, for example, a ball bearing including an outer race, an inner race, and a plurality of balls that cause relative rotation of the outer race and the inner race. The outer race of the lower bearing 51 is fixed to a radially inner end of the bottom plate 411 of the housing main body 41. The outer race of the upper bearing 52 is fixed to a radially inner end of the bearing holder 42. The inner races of the lower bearing 51 and upper bearing 52 are fixed to the shaft 31. The shaft 31 is thus supported to be rotatable relative to the housing main body 41 and the bearing holder 42. However, any bearing such as a sliding bearing or a fluid bearing may be used in place of a ball bearing.

Figure 3:
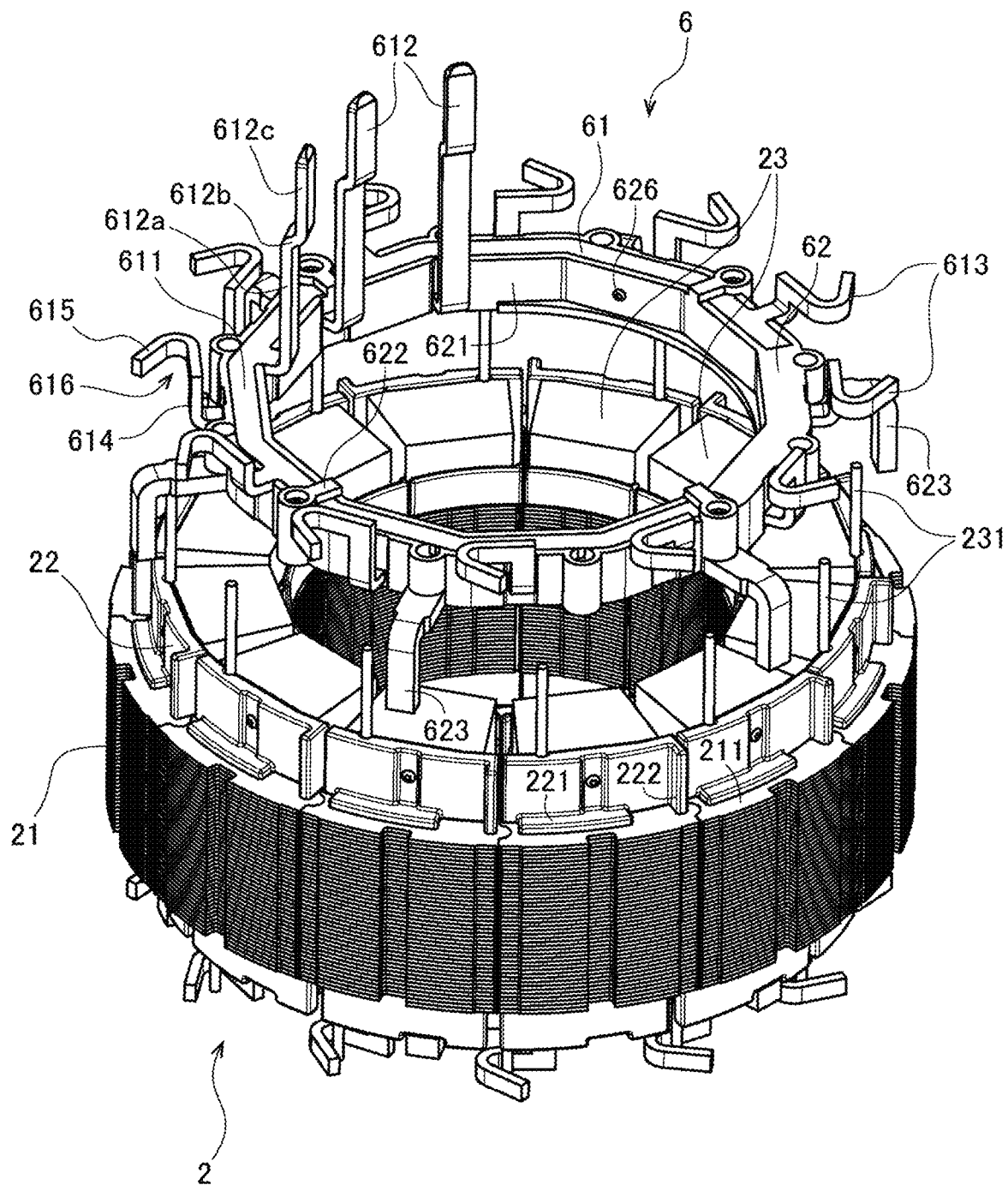
FIG. 3 is an exploded perspective view of a stator and a bus bar assembly according to an example embodiment of the present disclosure.
Figure 4:
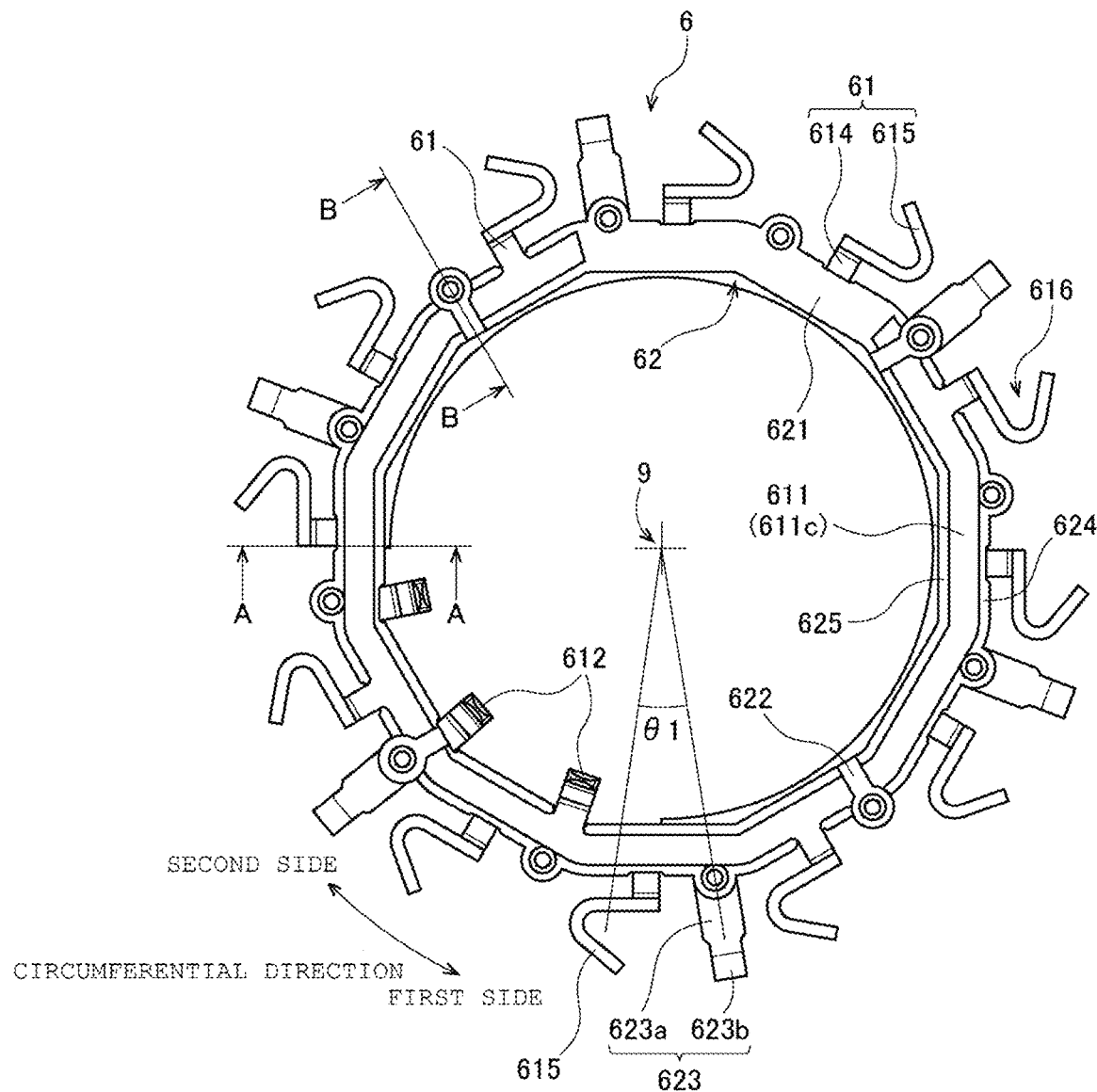
FIG. 4 is a top view of the bus bar assembly.
Figure 5:
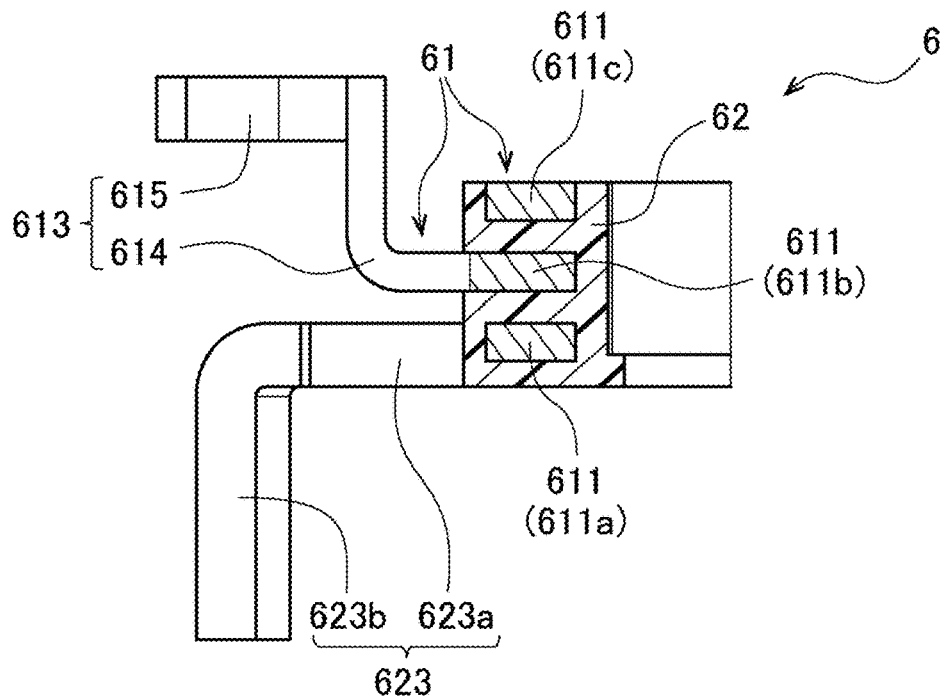
FIG. 5 is a sectional view of the bus bar assembly taken along line A-A in FIG. 4.
Figure 6:
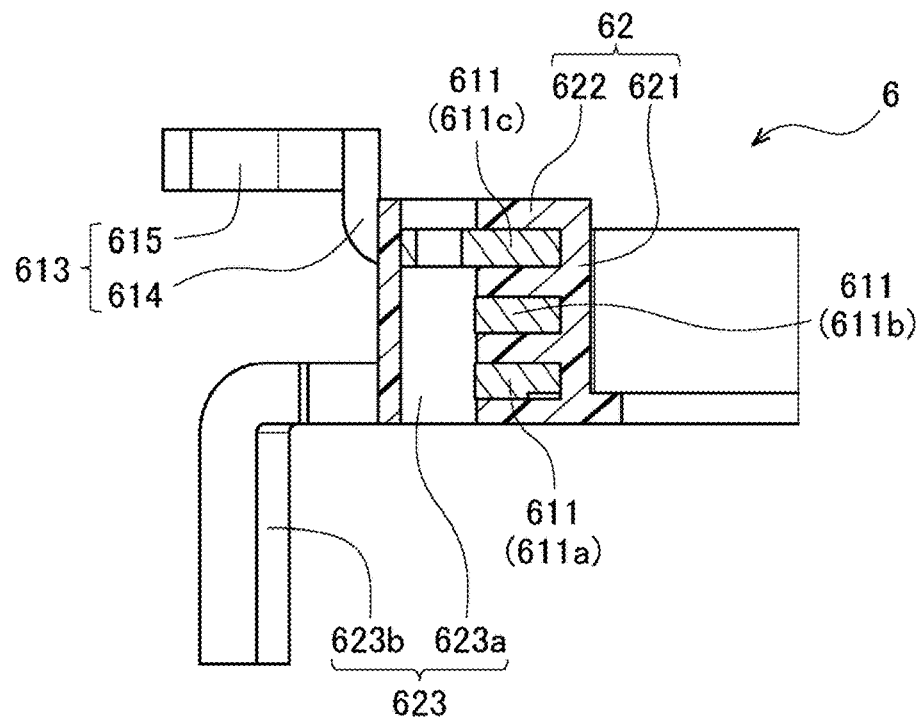
FIG. 6 is a sectional view of the bus bar assembly taken along line B-B in FIG. 4.

The motor 1 according to the present example embodiment includes a bus bar assembly 6. The bus bar assembly 6 is a unit for electrically connecting the coils 23 to the circuit board (not illustrated). FIG. 3 is an exploded perspective view of the stator 2 and the bus bar assembly 6. FIG. 4 is a top view of the bus bar assembly 6. FIG. 5 is a sectional view of the bus bar assembly 6 taken along line A-A in FIG. 4. FIG. 6 is a sectional view of the bus bar assembly 6 taken along line B-B in FIG. 4.

As illustrated in FIG. 3, the stator 2 according to the present example embodiment includes 12 coils 23. The 12 coils 23 include four U-phase coils that carry U-phase current of three-phase alternating current, four V-phase coils that carry V-phase current of the three-phase alternating current, and four W-phase coils that carry W-phase current of the three-phase alternating current. Each of the coils 23 includes a single conducting wire. In other words, the 12 coils 23 according to the present example embodiment include four U-phase conducting wires that carry the U-phase current, four V-phase conducting wires that carry the V-phase current, and four W-phase conducting wires that carry the W-phase current. The conducting wires have first ends that are drawn axially downward from the coils 23 and are electrically connected together. As illustrated in FIG. 3, the conducting wires have second ends drawn axially upward from the coils 23. In the following description, the portions of the conducting wires drawn axially upward from the coils 23 are referred to as "lead wires 231".

The bus bar assembly 6 is located axially above the stator core 21, the insulator 22, and the coils 23. As illustrated in FIGS. 3 to 6, the bus bar assembly 6 includes three conductive members 61 (bus bars) and a bus bar holder 62.

The conductive members 61 are each made of a conductive metal. The three conductive members 61 each include a plate-shaped portion 611, a connection terminal 612, and four weld terminals 613. The plate-shaped portions 611 extend perpendicularly to the central axis 9, and extend in an arc or substantially arc shape about the central axis 9. The three plate-shaped portions 611 are arranged to axially overlap one another at the same radial position. The connection terminals 612 extend radially inward and axially upward from the plate-shaped portions 611. The connection terminals 612 have upper ends located axially above the bus bar holder 62. The upper ends of the connection terminals 612 are electrically connected to the circuit board described above.

The weld terminals 613 each include an arm portion 614 extending radially outward and axially upward from the corresponding plate-shaped portion 611, and a weld portion 615 disposed on a distal end of the arm portion 614. The weld portions 615 each have a weld recess 616 that is open toward a first side in the circumferential direction. Portions of the lead wires 231 in the axial direction are located in the weld recesses 616. The portions of the lead wires 231 are welded to the weld portions 615. The coils 23 are thus electrically connected to the conductive members 61.

As described above, the three conductive members 61 each include the four weld portions 615. Accordingly, the bus bar assembly 6 according to the present example embodiment includes the 12 weld portions 615 in total. The lead wires 231 of the four U-phase conducting wires described above are respectively welded to the four weld portions 615 of one of the conductive members 61. The lead wires 231 of the four V-phase conducting wires described above are respectively welded to the four weld portions 615 of another one of the conductive members 61. The ends of the four W-phase conducting wires described above are respectively welded to the four weld portions 615 of a remaining one of the conductive members 61.

The connection terminals 612 and the weld terminals 613 radially extend in opposite directions from the plate-shaped portions 611. The lead wires 231 can therefore be welded to the weld portions 615 of the weld terminals 613 without hindrance of the connection terminals 612. The 12 weld portions 615 are arranged equidistantly in the circumferential direction, and are disposed at an identical position in the axial direction and the radial direction. In a process of manufacturing the motor 1, the lead wires 231 are respectively welded to the weld portions 615 while the motor 1 is turned circumferentially at fixed intervals. This configuration thus enables improvement in efficiency of work for welding the lead wires 231 to the weld portions 615.

The bus bar holder 62 is an annular ring-shaped or substantially annular ring-shaped member that holds the three conductive members 61. The bus bar holder 62 is made of an insulating resin. The bus bar holder 62 is obtained by pouring a molten resin into a mold and then curing the resin with the plate-shaped portions 611 of the three conductive members 61 placed in the mold. In other words, the bus bar holder 62 is an insert molded product in which the three conductive members 61 are obtained by insert molding. The three conductive members 61 are held by the bus bar holder 62 so as to be spaced apart from one another. This configuration thus achieves electrical isolation among the three conductive members 61.

Next, a more detailed description will be given of the structure of the bus bar assembly 6. In the following description, an axially lowermost one of the plate-shaped portions 611 of the three conductive members 61 is referred to as a "lower plate-shaped portion 611a". An axially middle one of the plate-shaped portions 611 of the three conductive members 61 is referred to as a "middle plate-shaped portion 611b". An axially uppermost one of the plate-shaped portions 611 of the three conductive members 61 is referred to as an "upper plate-shaped portion 611c".

The bus bar holder 62 includes a holder main body 621 having an annular ring-shape or substantially annular ring-shape, and four pressing portions 622. The holder main body 621 covers the entire lower plate-shaped portion 611a and the entire middle plate-shaped portion 611b. The holder main body 621 also covers a lower surface, a radially inner end edge, and a radially outer end edge of the upper plate-shaped portion 611c. The upper plate-shaped portion 611c has an upper face that is partially exposed from the holder main body 621. In other words, a part of the upper face of the upper plate-shaped portion 611c is not covered with the bus bar holder 62 in the present example embodiment. This configuration enables reduction in axial size of the bus bar holder 62 as compared with a case where the upper face of the upper plate-shaped portion 611c is entirely covered with the bus bar holder 62.

The four pressing portions 622 cover a part of the upper face of the upper plate-shaped portion 611c. The pressing portions 622 each radially traverse the upper face of the upper plate-shaped portion 611c. The upper plate-shaped portion 611c is in contact with lower surfaces of the pressing portions 622. This configuration thus inhibits axially upward separation of the upper plate-shaped portion 611c from the holder main body 621. Particularly in the present example embodiment, the four pressing portions 622 are equidistantly arranged in the circumferential direction. This configuration therefore inhibits separation of the entire upper plate-shaped portion 611c in the circumferential direction from the holder main body 621.

In the process of manufacturing the motor 1, the lead wires 231 are welded to the weld portions 615 with the weld portions 615 radially held by a welding jig. Contact of the jig with the bus bar holder 62 causes melting of the bus bar holder 62. In order to avoid the contact, it is necessary to secure a satisfactory space between the weld portions 615 and the bus bar holder 62. If the pressing portions 622 and the weld portions 615 are arranged at the same circumferential position, the weld portions 615 are required to be arranged radially outward or axially upward in order to secure a clearance between the weld portions 615 and the pressing portions 622. This results in increase in radial or axial size of the bus bar assembly 6.

In contrast to this, in the present example embodiment, the four pressing portions 622 are different in circumferential position from the weld portions 615. Specifically, the upper face of the upper plate-shaped portion 611c is exposed from the holder main body 621 at an identical position with at least the weld portions 615 in the circumferential direction. This configuration thus inhibits contact of the welding jig with the pressing portions 622, and enables compact arrangement of the weld portions 615 at the radially inner side and the axially lower side.

In the present example embodiment, specifically, the radial position of the weld portions 615 is located radially inside radially outer ends of the coils 23. This configuration thus enables reduction in radial size of the bus bar assembly 6. In addition, the weld portions 615 may be at least partially located at an identical height with the pressing portions 622. This configuration thus enables reduction in axial size of the bus bar assembly 6.

As illustrated in FIG. 4, the holder main body 621 includes an outer edge 624 and an inner edge 625. The outer edge 624 is located radially outside the upper plate-shaped portion 611c. The inner edge 625 is located radially inside the upper plate-shaped portion 611c. The upper plate-shaped portion 611c has a radially outer end edge that is in contact with the outer edge 624. This configuration thus inhibits radially outward misalignment of the upper plate-shaped portion 611c. The radially inner end edge of the upper plate-shaped portion 611c is also in contact with the inner edge 625. This configuration thus inhibits radially inward misalignment of the upper plate-shaped portion 611c.

In addition, the outer edge 624 and the inner edge 625 each have an upper face located at an identical height with the upper face of the upper plate-shaped portion 611c. This configuration thus inhibits axially upward protrusion of the outer edge 624 and the inner edge 625, and enables further reduction in axial size of the bus bar assembly 6.

The bus bar holder 62 also includes six leg portions 623. The six leg portions 623 are equidistantly arranged in the circumferential direction. The leg portions 623 each include a transverse leg portion 623a and a vertical leg portion 623b. The transverse leg portions 623a extend radially outward from a lower end of an outer peripheral surface of the holder main body 621. The vertical leg portions 623b extend axially downward from radially outer ends of the transverse leg portions 623a. As illustrated in FIG. 2, the vertical leg portions 623b have lower ends that are in contact with an upper face of the core back 211 of the stator core 21. The bus bar assembly 6 is thus axially positioned with respect to the stator core 21.

In the present example embodiment, the six leg portions 623 are different in circumferential position from the weld portions 615. A sufficient space is thus secured between the weld portions 615 and the leg portions 623. This configuration therefore inhibits contact of the welding jig with the leg portions 623 in welding the lead wires 231 to the weld portions 615.

The bus bar holder 62 according to the present example embodiment covers a small area of the upper plate-shaped portion 611c. In manufacturing the bus bar holder 62 by molding, therefore, a molten resin is poured into a mold from radially inward of the three plate-shaped portions 611 rather than from above the upper plate-shaped portion 611c. The molten resin spreads radially inward through a clearance between two of the plate-shaped portions 611. As illustrated in FIG. 3, the bus bar holder 62 thus manufactured has a gate mark 626 formed on a radially inner face of the holder main body 621.

The number of conductive members 61 of the bus bar assembly 6 is not necessarily three. The number of conductive members 61 may be not more than two or not less than four in accordance with a connection form of the coils 23. In the holder main body 621, preferably, the upper face of the upper plate-shaped portion 611c located on the uppermost side is at least partially exposed from the holder main body 621.

Figure 7:
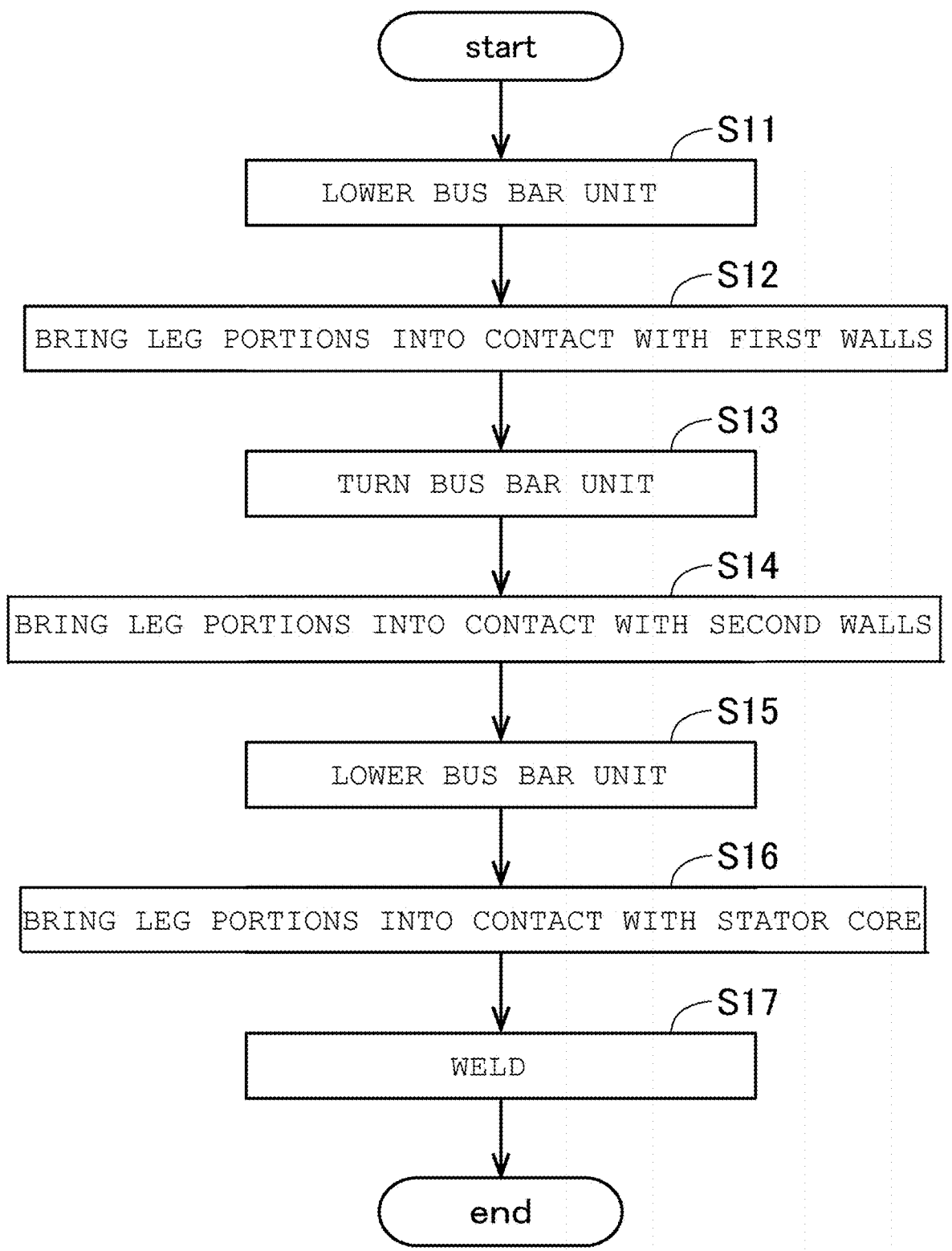
FIG. 7 is a flowchart of bus bar assembly mounting work according to an example embodiment of the present disclosure.
Figure 8:
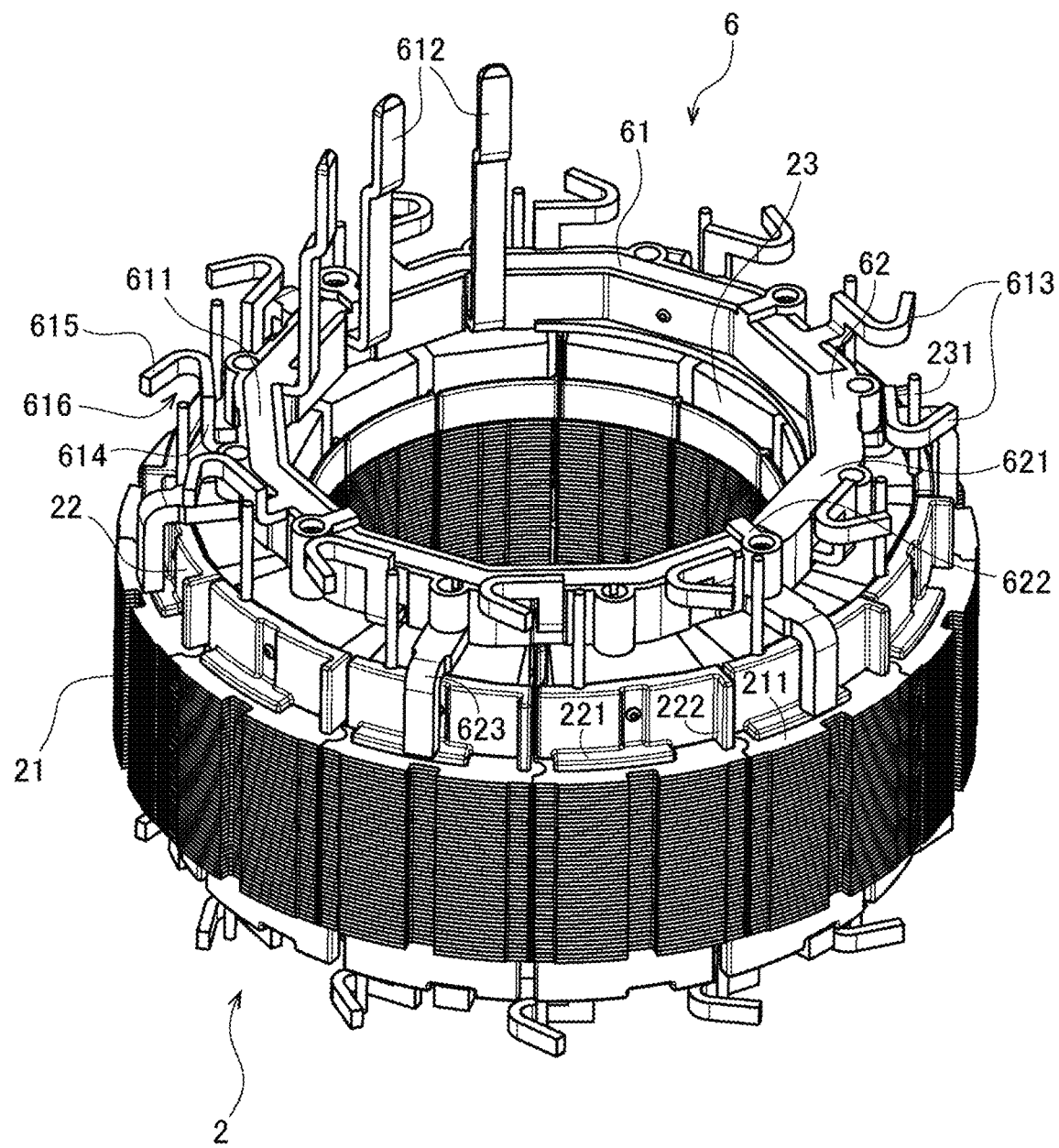
FIG. 8 is a perspective view of the stator and the bus bar assembly in the course of the bus bar assembly mounting work.
Figure 9:
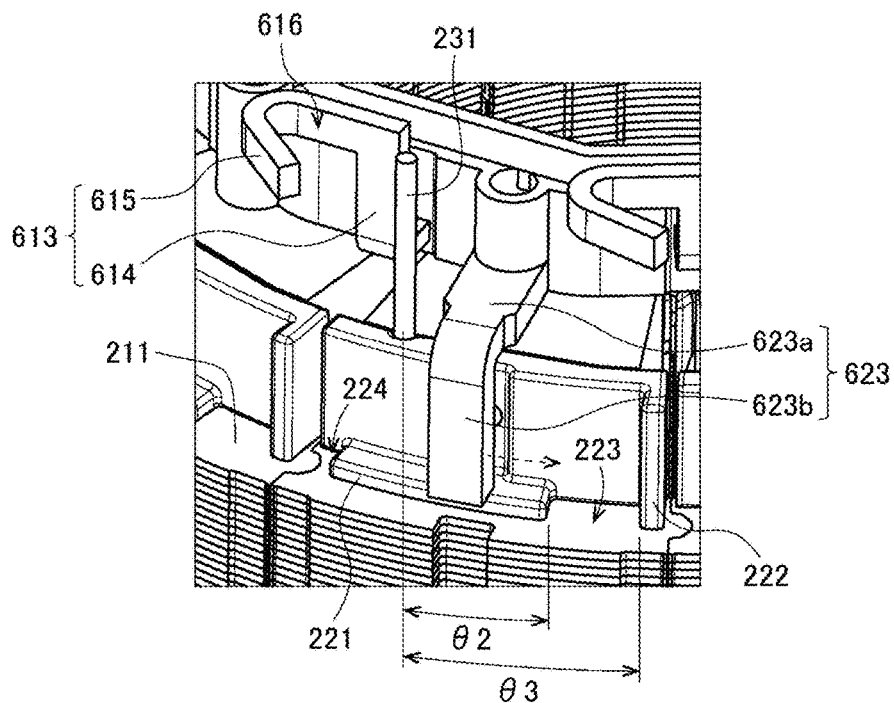
FIG. 9 is a partial perspective view of the stator and the bus bar assembly in the course of the bus bar assembly mounting work.
Figure 10:
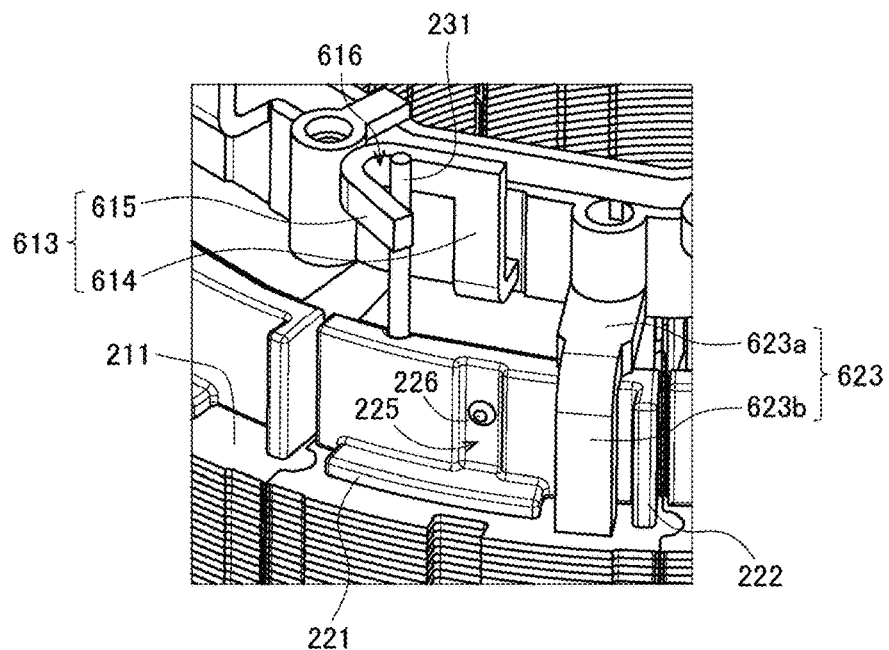
FIG. 10 is a partial perspective view of the stator and the bus bar assembly in the course of the bus bar assembly mounting work.

Next, a description will be given of work for mounting the bus bar assembly 6 to the insulator 22 of the stator 2 in the process of manufacturing the motor 1. FIG. 7 is a flowchart of the work. FIG. 8 is a perspective view of the stator 2 and the bus bar assembly 6 in the course of the work. FIGS. 9 and 10 are partial perspective views of the stator 2 and the bus bar assembly 6 in the course of the work.

As illustrated in FIG. 3 as well as FIGS. 8 to 10, the insulator 22 according to the present example embodiment includes 12 first walls 221 and 12 second walls 222. In other words, the insulator 22 according to the present example embodiment includes sets of first walls 221 and second walls 222, the sets being equal in number to the coils 23. The first walls 221 and the second walls 222 are located axially above the core back 211 of the stator core 21. In addition, the first walls 221 and the second walls 222 are arranged alternately in the circumferential direction.

The first walls 221 are projections that protrude radially outward and extend circumferentially from an outer peripheral surface of the insulator 22. Each of the second walls 222 is spaced apart from the adjoining first wall 221 at a first side in the circumferential direction. The second walls 222 are projections that protrude radially outward and extend axially from the outer peripheral surface of the insulator 22. The second walls 222 have upper ends located axially above upper ends of the first walls 221.

There is a first clearance 223 between a circumferentially first end of each of the first walls 221 and a circumferentially second end face of the adjoining second wall 222. The first clearances 223 are clearances where the vertical leg portions 623b of the bus bar holder 62 are disposed after the manufacturing. The first clearances 223 have circumferential widths larger than circumferential sizes of the vertical leg portions 623b. In addition, there is a second clearance 224 between a circumferentially second end of each of the first walls 221 and a circumferentially first end face of the adjoining second wall 222. The second clearances 224 have circumferential widths smaller than circumferential sizes of the vertical leg portions 623b.

In mounting the bus bar assembly 6 to the insulator 22 of the stator 2, first, the bus bar assembly 6 is moved axially downward from the state illustrated in FIG. 3 (step S11). The bus bar assembly 6 is thus axially brought close to the stator 2. Lower ends of the vertical leg portions 623b then come into contact with the upper faces of the first walls 221 as illustrated in FIGS. 8 and 9 (step S12). The bus bar assembly 6 thus stops to move axially downward.

The first walls 221 have circumferential lengths satisfactorily larger than the circumferential sizes of the vertical leg portions 623b. Therefore, the lower ends of the vertical leg portions 623b come into contact with the upper faces of the first walls 221 even when the circumferential position of the vertical leg portions 623b relative to the first walls 221 becomes misaligned to some degree. In steps S11 and S12, it is hence unnecessary to strictly position the bus bar assembly 6 with respect to the stator 2 in the circumferential direction.

In addition, the circumferential widths of the second clearances 224 are smaller than the circumferential sizes of the vertical leg portions 623b. Therefore, there is no possibility that the vertical leg portions 623b are erroneously inserted into the second clearances 224 in steps S11 and S12.

Next, the bus bar assembly 6 is turned toward a first side in the circumferential direction with respect to the stator 2 (step S13). The leg portions 623 are thus moved toward the first side in the circumferential direction along the upper faces of the first walls 221 as indicated by an arrow shown with a broken line in FIG. 9. The leg portions 623 then come into contact with the second walls 222 to stop to turn (step S14).

In steps S13 and S14, the weld portions 615 are also moved toward the first side in the circumferential direction, from a position at which the weld portions 615 are distant from the lead wires 231 toward a second side in the circumferential direction (a position illustrated in FIG. 9) to a position at which the weld portions 615 overlap the lead wires 231 (a position illustrated in FIG. 10), in accordance with the turn of the bus bar assembly 6. The lead wires 231 are thus inserted into the weld recesses 616.

Next, the bus bar assembly 6 is moved axially downward with respect to the stator 2 (step S15). The vertical leg portions 623b are thus inserted into the first clearances 223 between the first walls 221 and the second walls 222. As a result, the leg portions 623 are circumferentially positioned with respect to the insulator 22. In addition, the weld portions 615 are also circumferentially positioned with respect to the lead wires 231.

Thereafter, the lower ends of the vertical leg portions 623b come into contact with the upper face of the core back 211 of the stator core 21 (step S16). The bus bar assembly 6 is thus axially positioned with respect to the stator 2. In the present example embodiment, the insulator 22 is not interposed between the upper face of the stator core 21 and the leg portions 623. The bus bar assembly 6 is therefore accurately positioned with respect to the stator core 21 in the axial direction without an influence of a dimensional error of the insulator 22.

After completion of step S16, as illustrated in FIG. 10, the upper ends of the lead wires 231 are located in the weld recesses 616 of the weld portions 615. In this state, pressure is applied to the weld portions 615 radially held by the welding jig. In addition, heat or voltage is also applied to the weld portions 615. The lead wires 231 are thus welded to the weld portions 615 (step S17).

In the process of manufacturing the motor 1, as described above, in mounting the bus bar assembly 6 to the insulator 22 of the stator 2, first, the lower ends of the vertical leg portions 623b are brought into contact with the upper faces of the first walls 221, and then the bus bar assembly 6 is turned around the central axis 9, so that the vertical leg portions 623b are inserted into the first clearances 223 between the first walls 221 and the second walls 222. The weld portions 615 are thus easily positioned with respect to the lead wires 231 in the circumferential direction.

In FIG. 4, "θ1" represents a circumferential center angle formed by one of the leg portions 623 and the adjacent weld portion 615 to the leg portion 623 at the second side in the circumferential direction, in the bus bar assembly 6. In FIG. 9, "θ2" represents a circumferential center angle formed by the lead wire 231 to be welded to the weld portion 615 and a circumferentially first end of the first wall 221 which the leg portion 623 is in contact with, in the stator 2. Also in FIG. 9, "θ3" represents a circumferential center angle formed by the lead wire 231 to be welded to the weld portion 615 and a circumferentially second end face of the second wall 222 which the leg portion 623 is in contact with, in the stator 2. Desirably, the center angles θ1, θ2, and θ3 satisfy the relationship of θ2<θ1<θ3.

On condition that the relationship is satisfied, the lead wire 231 is disposed in the weld recess 616 of the weld portion 615 when the vertical leg portion 623b is inserted into the first clearance 223 between the first wall 221 and the second wall 222.

With regard to a second one of the weld portions 615 counting from the leg portion 623 on the second side in the circumferential direction, θ1 is defined in a manner similar to that described above. In addition, θ2 and θ3 are defined in a manner similar to that described above, in relation to the lead wire 231 to be welded to the weld portion 615. Desirably, the center angles θ1, θ2, and θ3 also satisfy the relationship of θ2<θ1<θ3.

In the bus bar assembly 6 according to the present example embodiment, the number of weld portions 615 is 12, whereas the number of leg portions 623 is not 12, but six. Reducing the number of leg portions 623 leads to volume reduction of the resin for the bus bar holder 62, resulting in weight reduction of the bus bar assembly 6. Even when the number of leg portions 623 is smaller than the number of weld portions 615, the lead wires 231 are disposed in the weld recesses 616 of the weld portions 615 in such a manner that the leg portions 623 are positioned, as long as the relationship of θ2<θ1<θ3 is satisfied for each weld portion 615.

As illustrated in FIG. 10, the insulator 22 according to the present example embodiment includes grooves 225 and gate marks 226. The grooves 225 are recessed radially inward at axially upper sides of the first walls 221 on the outer peripheral surface of the insulator 22. The gate marks 226 are projections that are formed at positions where the gates of a mold are present upon injection molding of the insulator 22. The gate marks 226 are located in the grooves 225. When the gate marks 226 are disposed in the grooves 225, the gate marks 226 do not protrude radially outward from the outer peripheral surface of the insulator 22. In step S13 described above, accordingly, the vertical leg portions 623b are moved toward the first side in the circumferential direction without hindrance of the gate marks 226.

In the present example embodiment, the first walls 221 and the second walls 222 are located on the outer peripheral surface of the insulator 22. In steps S11 to S16 described above, therefore, a worker visually checks the movement of the leg portions 623 relative to the first walls 221 and the second walls 222 with ease. In addition, the orientation of the bus bar assembly 6 becomes stable as compared with a case where the leg portions 623 are disposed on a radially inner side of the insulator 22.

Figure 11:
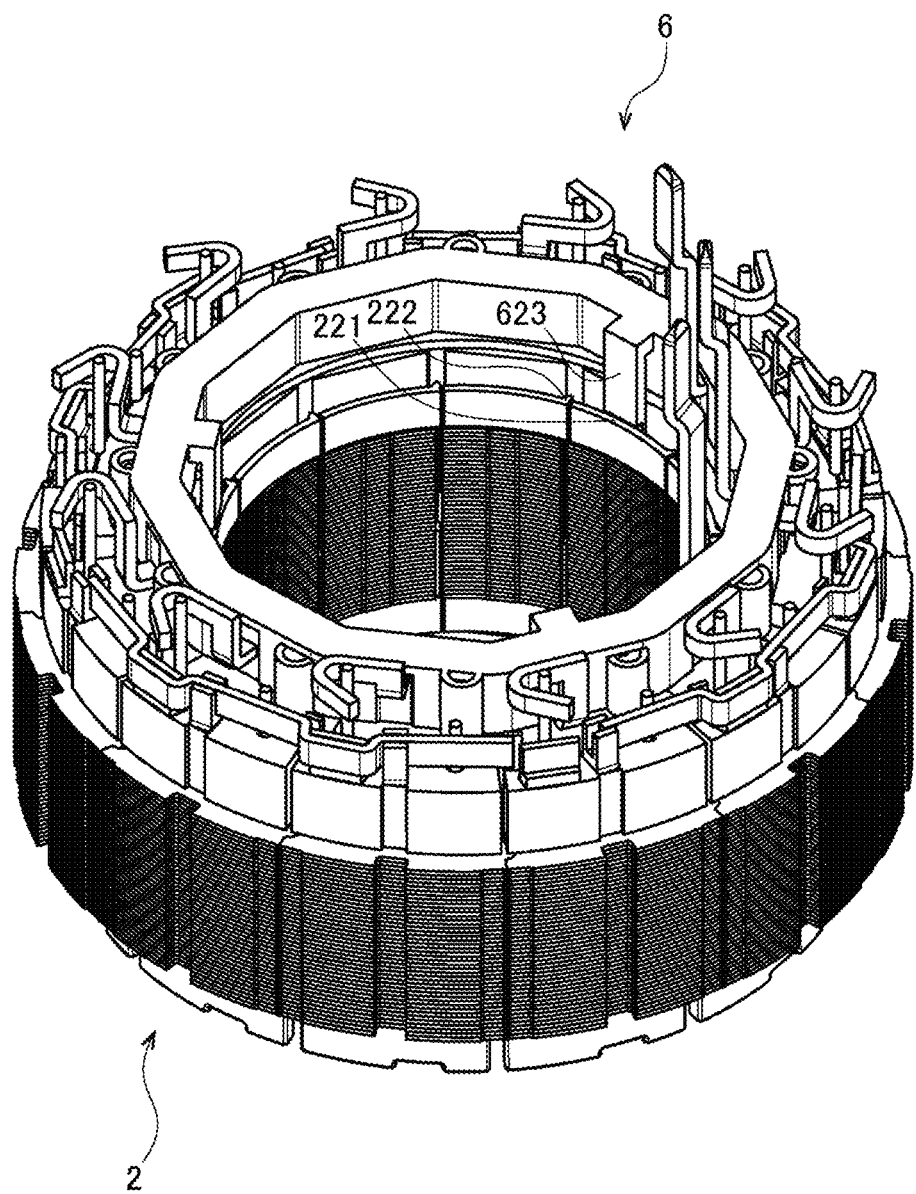
FIG. 11 is a perspective view of a stator and a bus bar assembly according to a modification example of an example embodiment of the present disclosure.

As illustrated in FIG. 11, the first walls 221 and the second walls 222 may alternatively be located on an inner peripheral surface of the insulator 22. In this case, the leg portions 623 of the bus bar holder 62 are inserted into the radially inner side of the insulator 22. The leg portions 623 are thus positioned by the first walls 221 and the second walls 222 at the radially inner side of the insulator 22.

Figure 12:
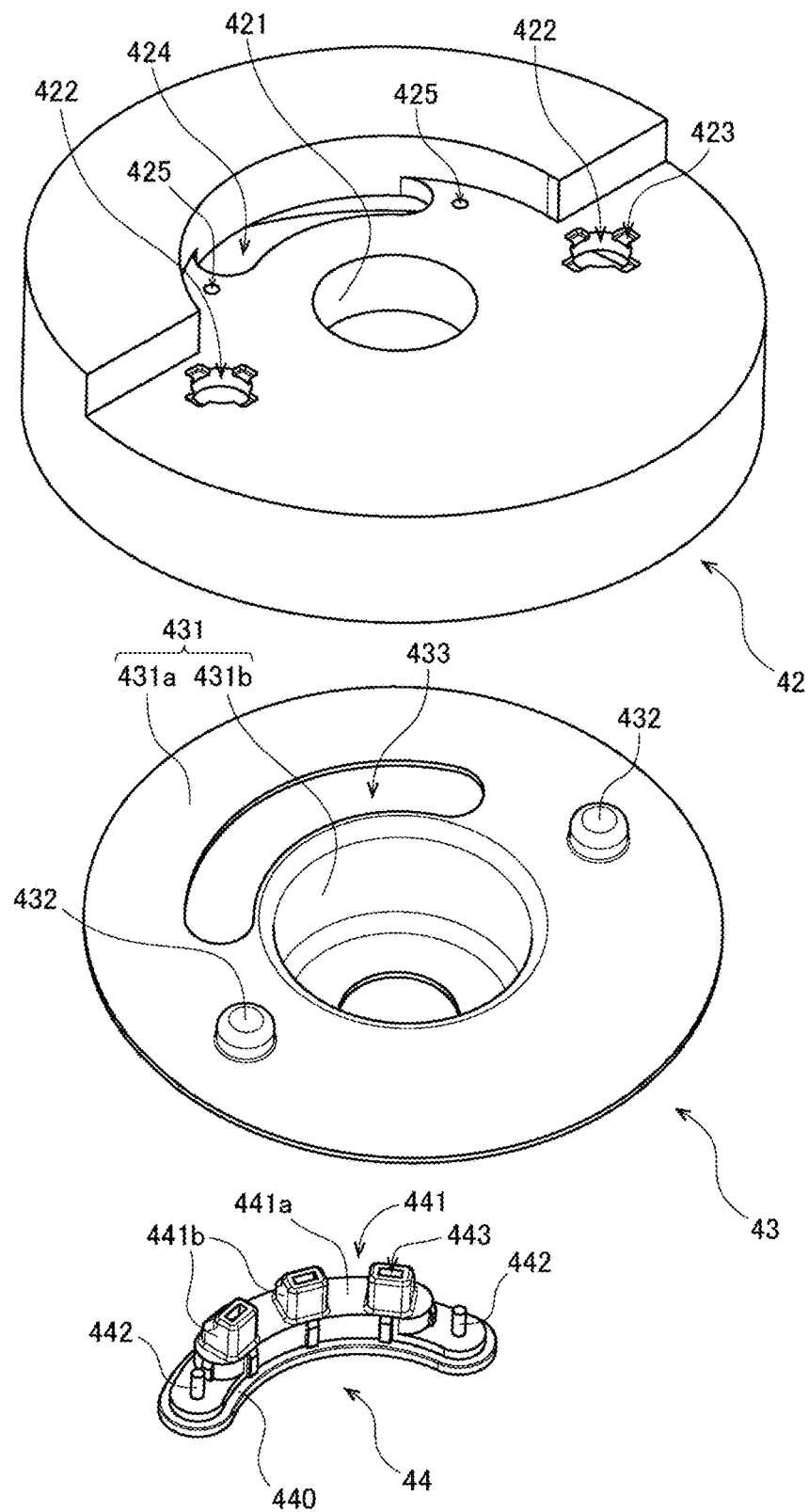
FIG. 12 is an exploded perspective view of a bearing holder, a shield plate, and a lead bushing according to an example embodiment of the present disclosure.

Next, a description will be given of a shield plate 43 to be attached to the bearing holder 42. FIG. 12 is an exploded perspective view of the bearing holder 42, the shield plate 43, and a lead bushing 44 to be described later.

In putting the motor 1 to use, a magnetic sensor is placed axially above the bearing holder 42. The magnetic sensor detects a magnetic flux of a sensor magnet fixed to the shaft 31, thereby detecting a rotational position of the rotor 3. If the magnetic sensor detects a magnetic flux generated from the stator 2, the magnetic sensor may erroneously detect the rotational position of the rotor 3. In order to avoid the erroneous detection by the magnetic sensor, the motor 1 according to the present example embodiment includes the shield plate 43 disposed axially above the stator 2 to shield the magnetic flux. The shield plate 43 is made of a magnetic metal such as iron.

As illustrated in FIG. 12, the shield plate 43 includes a shield plate main body 431 and two protrusions 432. The shield plate 43 is obtained in such a manner that a metal plate is subjected to press working. The press working facilitates the fabrication of the shield plate 43 as compared with another processing such as cutting.

The shield plate main body 431 is located between the bearing holder 42 and the stator 2. The shield plate main body 431 extends along a lower surface of the bearing holder 42. The shield plate main body 431 according to the present example embodiment includes a disk portion 431a and a central recess 431b. The disk portion 431a has a disk or substantially disk shape about the central axis 9. The central recess 431b is recessed axially downward at a radially inner side of the disk portion 431a. The bearing holder 42 has on its radially inner end a bearing holding portion 421 holding the upper bearing 52. The central recess 431b covers a lower surface and an outer peripheral surface of the bearing holding portion 421.

The two protrusions 432 protrude upward from the disk portion 431a of the shield plate main body 431. The two protrusions 432 are equidistantly arranged in the circumferential direction. In the present example embodiment, the two protrusions 432 are located on opposite sides across the central axis 9. On the other hand, the bearing holder 42 has two through-holes 422. The through-holes 422 axially penetrate through the bearing holder 42. The two protrusions 432 are respectively inserted in the through-holes 422.

Figure 13A:
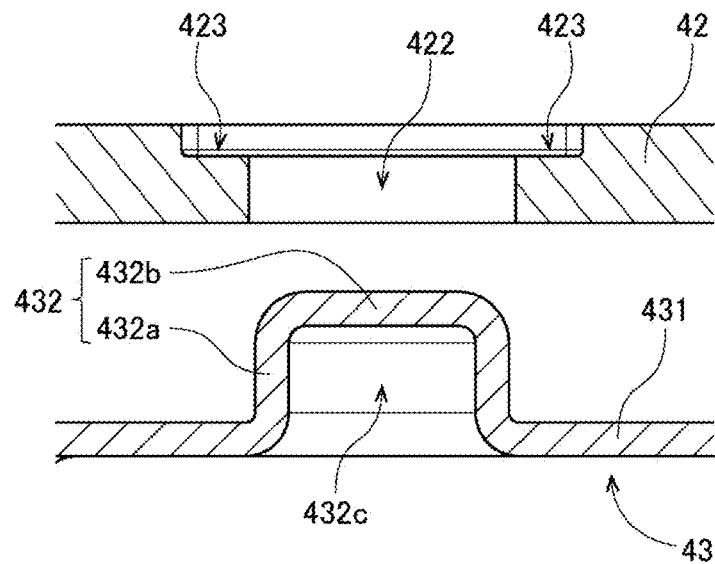
FIG. 13A is a longitudinal sectional view of a state in fixing the shield plate to the bearing holder.
Figure 13B:
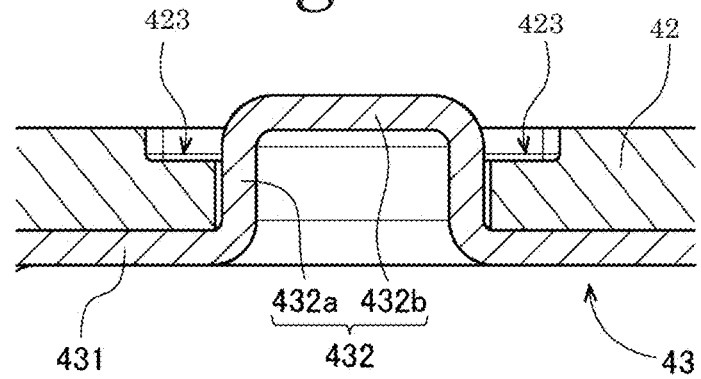
FIG. 13B is a longitudinal sectional view of the state in fixing the shield plate to the bearing holder.
Figure 13C:
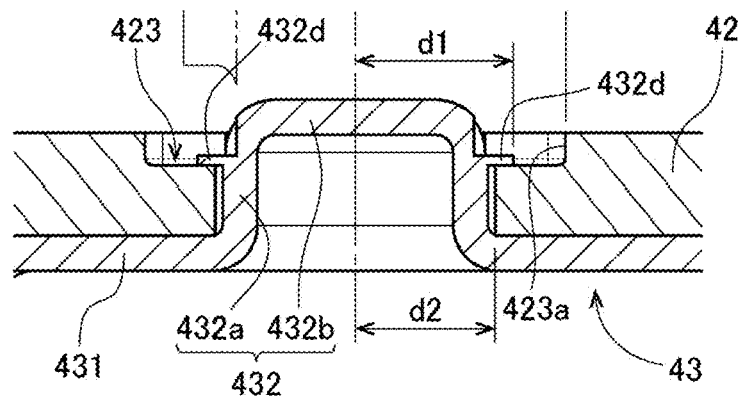
FIG. 13C is a longitudinal sectional view of the state in fixing the shield plate to the bearing holder.

FIGS. 13A to 13C are longitudinal sectional views of a state in fixing the shield plate 43 to the bearing holder 42 in the process of manufacturing the motor 1. As illustrated in FIGS. 13A to 13C, each of the protrusions 432 according to the present example embodiment has a one end-closed tubular or substantially tubular shape. Specifically, each of the protrusions 432 includes a tubular portion 432a and a top plate 432b. The tubular portions 432a have a cylindrical or substantially cylindrical shape and extend axially. The tubular portions 432a may alternatively have a polygonal tubular or substantially polygonal tubular shape. The top plates 432b close upper sides of the tubular portions 432a. The protrusions 432 accordingly have hollow portions 432c defined therein.

As illustrated in FIG. 12 as well as FIGS. 13A to 13C, the bearing holder 42 has in its upper face a plurality of recesses 423 located around an upper end of each through-hole 422. In the present example embodiment, four recesses 423 are arranged around one through-hole 422 at equiangular spacings. The recesses 423 are recessed axially downward in the upper face of the bearing holder 42.

In fixing the shield plate 43 to the bearing holder 42, first, as illustrated in FIG. 13A, the shield plate 43 is brought close to the bearing holder 42 from axially below the bearing holder 42. As illustrated in FIG. 13B, next, the two protrusions 432 of the shield plate 43 are respectively inserted into the two through-holes 422 in the bearing holder 42. The upper ends of the protrusions 432 thus protrude axially upward of the upper face of the bearing holder 42. At this time, the upper face of the shield plate main body 431 comes into contact with the lower surface of the bearing holder 42.

Next, a crimping blade B is pressed axially downward against an upper end of each tubular portion 432a. As illustrated in FIG. 13C, the upper end of each tubular portion 432a is plastically deformed outward, and is formed into working deformation portions 432d.

Figure 14:
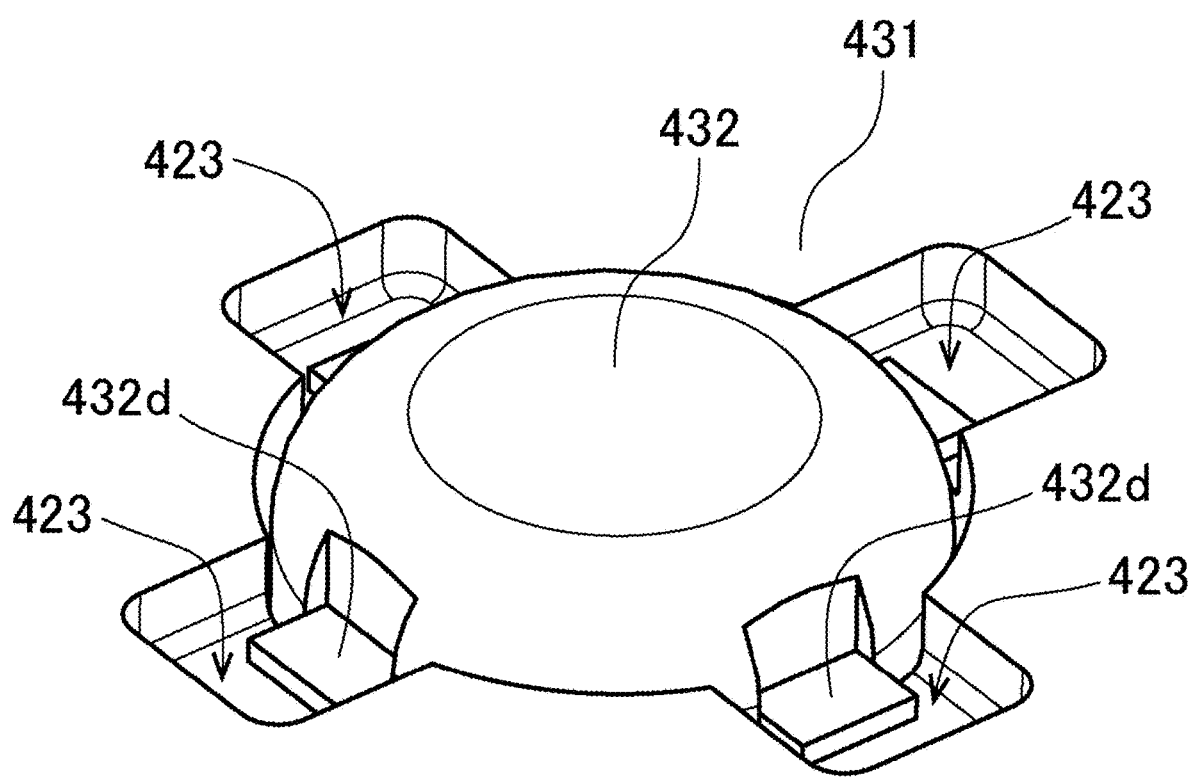
FIG. 14 is a perspective view of a protrusion including a working deformation portion according to an example embodiment of the present disclosure.

FIG. 14 is a perspective view of one of the protrusions 432 having the working deformation portions 432d. As illustrated in FIG. 14, in the present example embodiment, one protrusion 432 has four working deformation portions 432d. The four working deformation portions 432d are arranged at equiangular spacings. The working deformation portions 432d are at least partially accommodated in the recesses 423. The working deformation portions 432d come into contact with bottom faces of the recesses 423 forming a part of the upper face of the bearing holder 42. As a result, the bearing holder 42 is partially held between the upper face of the shield plate main body 431 and the working deformation portions 432d in the axial direction as illustrated in FIG. 13C. The shield plate 43 is thus fixed to the bearing holder 42.

As described above, in the present example embodiment, the protrusions 432 of the shield plate 43 are inserted into the through-holes 422 in the bearing holder 42, and the upper ends of the protrusions 432 are deformed so as to come into contact with the upper face of the bearing holder 42. The shield plate 43 is thus firmly fixed to the bearing holder 42 with a small number of man-hours.

Particularly in the present example embodiment, the four working deformation portions 432d are arranged around the upper end of each protrusion 432. As described above, one protrusion 432 is provided with a plurality of working deformation portions 432d, so that the strength of fixing the shield plate 43 to the bearing holder 42 is further improved. As described in the present example embodiment, desirably, the working deformation portions 432d are arranged around the upper end of each protrusion 432 at equiangular spacings. The state of fixing the shield plate 43 to the bearing holder 42 is thus made stable.

Also in the present example embodiment, the working deformation portions 432d are at least partially accommodated in the recesses 423 in the upper face of the bearing holder 42. This configuration enables reduction in amount of protrusion of the working deformation portions 432d from the upper face of the bearing holder 42. This configuration therefore enables reduction in axial size of the motor 1. If the axial size is acceptable, the working deformation portions 432d may be brought into contact with the flat upper face, in which no recesses 423 are formed, of the bearing holder 42.

In FIG. 13C, "d1" represents a length from a center line of each protrusion 432 to an outer end of the corresponding working deformation portion 432d. Also in FIG. 13C, "d2" represents a radius of the through-hole 422. Also in FIG. 13C, "d3" represents a length from the center line of the protrusion 432 to the end face 423a intersecting with the bottom face of the recess 423. Desirably, the length d1, the radius d2, and the length d3 satisfy the relationship of d2<d1<d3. This configuration enables contact of the working deformation portions 432d with the bottom faces of the recesses 423, and inhibits partial protrusion of the working deformation portions 432d from the recesses 423.

Next, a description will be given of the lead bushing 44 holding the connection terminals 612 of the three conductive members 61.

As illustrated in FIGS. 1, 2, and 12, the housing 4 according to the present example embodiment includes the lead bushing 44. The lead bushing 44 is a member made of an elastic resin. The lead bushing 44 is fixed to the bearing holder 42. The connection terminals 612 of the three conductive members 61 extend from the inner side of the housing 4 to the axially upper and outer side of the housing 4 through the conductive members 61. This configuration thus achieves isolation of the connection terminals 612 from the housing 4.

As illustrated in FIG. 12, the lead bushing 44 includes a base 440, a first protrusion 441, and a pair of second protrusions 442. The base 440 is located between the bearing holder 42 and at least one of the stator 2 and the rotor main body 32. The base 440 has an upper face that is in contact with the lower surface of the bearing holder 42. The first protrusion 441 protrudes axially upward from the base 440. The three connection terminals 612 are held by the first protrusion 441. The two second protrusions 442 protrude axially upward from the base 440. The first protrusion 441 is located between the second protrusions 442.

As illustrated in FIG. 12, the bearing holder 42 has a first through-hole 424 and a pair of second through-holes 425. The first through-hole 424 is located between the second through-holes 425. The first through-hole 424 and the second through-holes 425 axially penetrate through the bearing holder 42. As illustrated in FIG. 12, the shield plate 43 has a third through-hole 433. The third through-hole 433 axially penetrates through the disk portion 431a of the shield plate main body 431.

The lead bushing 44 is entirely inserted in the third through-hole 433 in the shield plate 43. The first protrusion 441 of the lead bushing 44 is inserted in the first through-hole 424 in the bearing holder 42. The second protrusions 442 of the lead bushing 44 are respectively inserted in the second through-holes 425 in the bearing holder 42.

The first protrusion 441 according to the present example embodiment includes a lower protrusion 441a and three upper protrusions 441b. The lower protrusion 441a protrudes axially upward from the base 440. The lower protrusion 441a is fitted to the first through-hole 424. The three upper protrusions 441b protrude axially upward from the lower protrusion 441a.

The lead bushing 44 has three insertion holes 443. The three insertion holes 443 axially penetrate through the lead bushing 44 from upper ends of the upper protrusions 441b to a lower surface of the base 440. The three connection terminals 612 are respectively inserted in the three insertion holes 443. Specifically, the connection terminals 612 extend from the inner side of the housing 4 to the axially upper and outer side of the housing 4 through the base 440, the lower protrusion 441a, and the upper protrusions 441b.

The number of connection terminals 612 of the bus bar assembly 6 is not necessarily limited to three. The bus bar assembly 6 may include connection terminals 612 the number of which is not more than two or not less than four. In this case, the number of upper protrusions 441b of the lead bushing 44 may be not more than two or not less than four in accordance with the number of connection terminals 612.

Figure 15A:
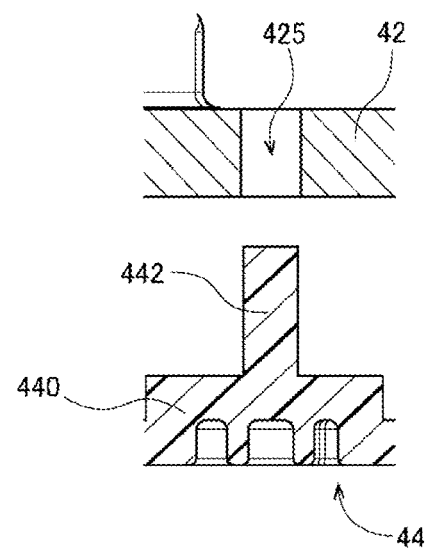
FIG. 15A is a longitudinal sectional view of a second protrusion and its surroundings in fixing the lead bushing to the bearing holder.
Figure 15B:
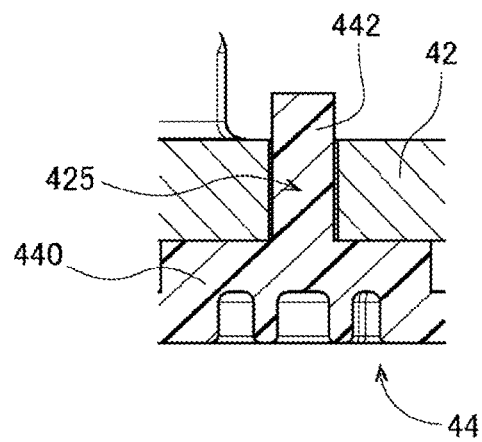
FIG. 15B is a longitudinal sectional view of the second protrusion and its surroundings in fixing the lead bushing to the bearing holder.
Figure 15C:
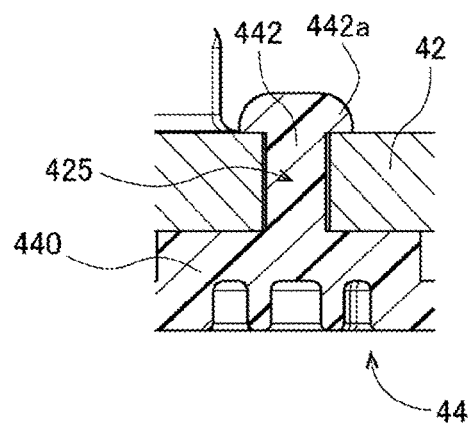
FIG. 15C is a longitudinal sectional view of the second protrusion and its surroundings in fixing the lead bushing to the bearing holder.

FIGS. 15A to 15C are longitudinal sectional views of one of the second protrusions 442 and its surroundings in fixing the lead bushing 44 to the bearing holder 42 in the process of manufacturing the motor 1.

In fixing the lead bushing 44 to the bearing holder 42, first, as illustrated in FIG. 15A, the lead bushing 44 is brought close to the bearing holder 42 from axially below the bearing holder 42. The first protrusion 441 of the lead bushing 44 is then inserted into the first through-hole 424 in the bearing holder 42. As illustrated in FIG. 15B, the two second protrusions 442 of the lead bushing 44 are respectively inserted into the two second through-holes 425 in the bearing holder 42. Upper ends of the second protrusions 442 thus protrude axially upward of the upper face of the bearing holder 42. In other words, the upper ends of the second protrusions 442 extend to the axially upper and outer side of the housing 4. At this time, the upper face of the base 440 comes into contact with the lower surface of the bearing holder 42.

As illustrated in FIG. 15C, next, the upper ends of the second protrusions 442 are molten by heat. Diameter increased portions 442a are thus formed to extend outward from the upper ends of the second protrusions 442. The diameter increased portions 442a close upper openings of the second through-holes 425. In addition, the diameter increased portions 442a come into contact with the upper face of the bearing holder 42. As a result, the bearing holder 42 is partially held between the upper face of the base 440 and the diameter increased portions 442a in the axial direction. The lead bushing 44 is thus fixed to the bearing holder 42.

As described above, in the present example embodiment, the second protrusions 442 of the lead bushing 44 are inserted in the second through-holes 425 in the bearing holder 42. In addition, the diameter increased portions 442a formed on the upper ends of the second protrusions 442 fix the lead bushing 44 to the bearing holder 42. This configuration thus requires less dimensional accuracy as compared with a case where the lead bushing 44 is press fitted to the bearing holder 42. This configuration also enables reduction in man-hours for working and mounting of the bearing holder 42 and the lead bushing 44.

Particularly in the present example embodiment, the second protrusions 442 are respectively fixed to the second through-holes 425. This configuration thus further improves the strength of fixing the lead bushing 44 to the bearing holder 42. Also in the present example embodiment, the first through-hole 424 is located between the two second through-holes 425. This configuration therefore stabilizes the position and orientation of the first protrusion 441 to be inserted into the first through-hole 424, by fixing the second protrusions 442 to the second through-holes 425.

The number of second through-holes 425 is not necessarily limited to two. The bearing holder 42 may have second through-holes 425 the number of which is not less than three. In this case, preferably, the lead bushing 44 includes second protrusions 442 equal in number to the second through-holes 425. The second protrusions 442 are respectively inserted in the second through-holes 425.

Also in the present example embodiment, the base 440 of the lead bushing 44 extends along the lower surface of the bearing holder 42. The base 440 closes the lower opening of the first through-hole 424 and the lower openings of the two second through-holes 425. This configuration blocks entry of dust or droplets into the housing 4 through the first through-hole 424 or the second through-holes 425.

Also in the present example embodiment, the first protrusion 441 of the lead bushing 44 includes the lower protrusion 441*a* fitted to the first through-hole 424. Specifically, the lower protrusion 441*a* has an outer peripheral surface fitting to an inner peripheral surface of the first through-hole 424. The lower protrusion 441*a* minimizes a clearance between the first protrusion 441 and the first through-hole 424. This configuration further blocks entry of dust or droplets from the outside of the housing 4 into the housing 4 through the first through-hole 424.

Next, a more detailed description will be given of the shapes of the connection terminals 612.

As described above, the three conductive members 61 of the bus bar assembly 6 each include the connection terminal 612. The three connection terminals 612 are arranged in proximity to one another in the circumferential direction. Specifically, the three connection terminals 612 are arranged within a range of 180° about the central axis 9.

As illustrated in FIGS. 2 and 3, each of the connection terminals 612 includes a lower terminal portion 612*a*, a bent portion 612*b*, and an upper terminal portion 612*c*. The lower terminal portions 612*a* extend axially upward from the same height as the plate-shaped portions 611 of the conductive members 61. The bent portions 612*b* extend radially inward from upper ends of the lower terminal portions 612*a*. The upper terminal portions 612*c* extend axially upward from radially inner ends of the bent portions 612*b*.

The lower terminal portions 612*a* are located radially outside the radially inner end faces of the teeth 212. The upper terminal portions 612*c* are located radially inside the radially inner end faces of the teeth 212. Particularly in the present example embodiment, the upper terminal portions 612*c* are located radially inside an outer peripheral surface of the rotor main body 32. The upper ends of the connection terminals 612 are also located radially inside the outer peripheral surface of the rotor main body 32.

Figure 16:
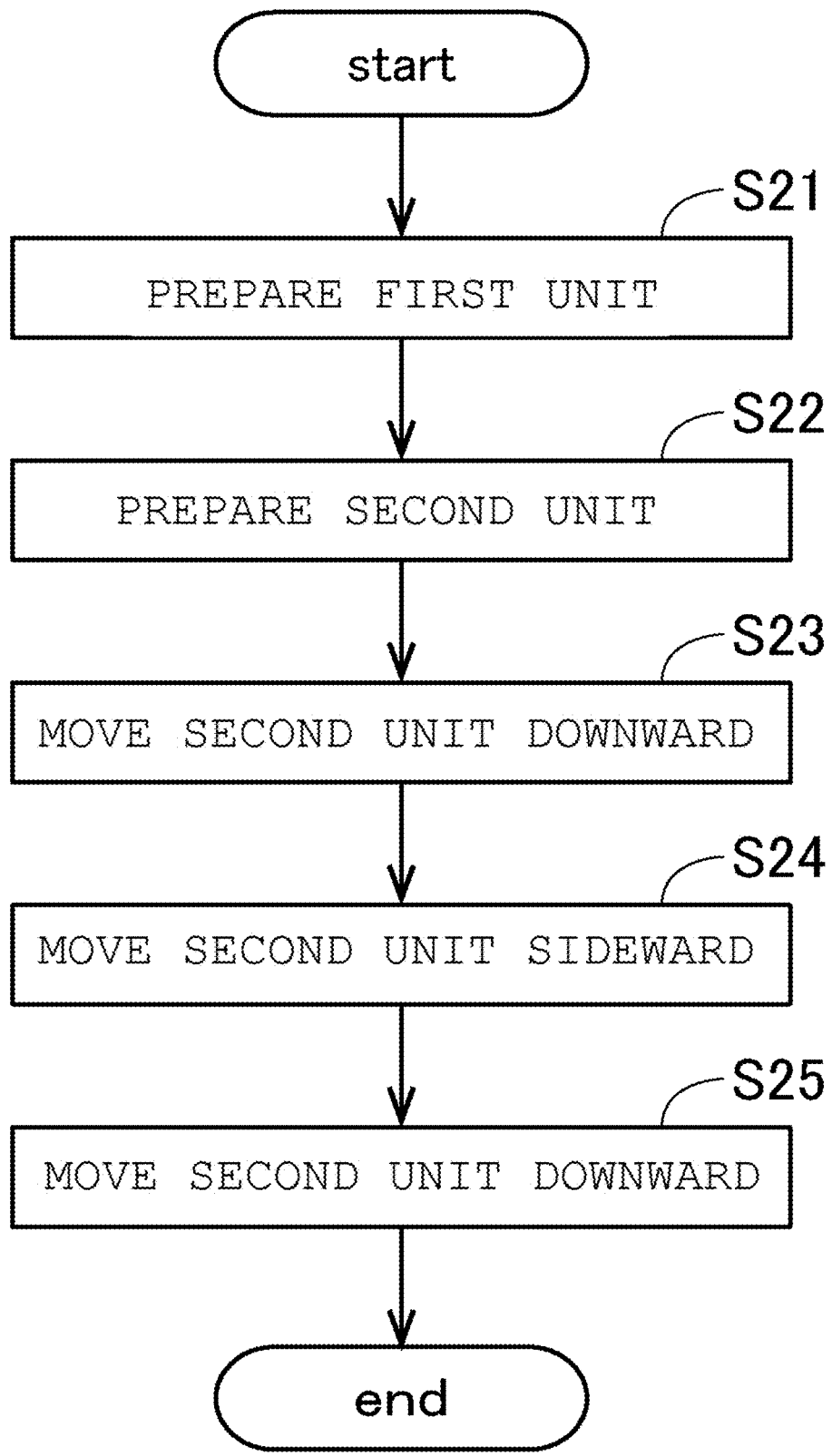
FIG. 16 is a flowchart of rotor mounting work according to an example embodiment of the present disclosure.
Figure 17:
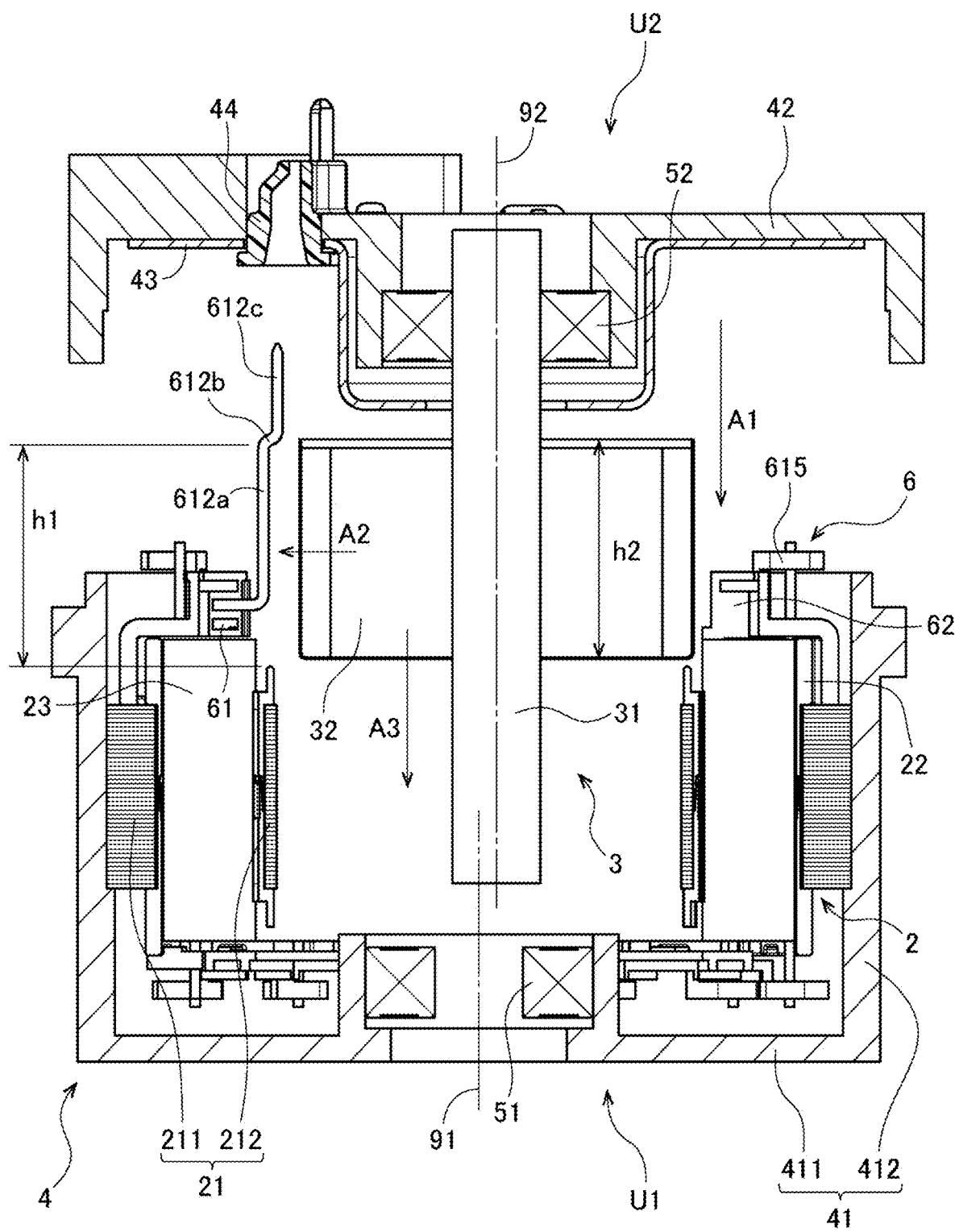
FIG. 17 is a longitudinal sectional view of the stator, a rotor, a housing, and the bus bar assembly in the course of the rotor mounting work.

The following description concerns work for mounting the rotor 3 to the stator 2 and the bus bar assembly 6 in the process of manufacturing the motor 1. FIG. 16 is a flowchart of the work. FIG. 17 is a longitudinal sectional view of the stator 2, the rotor 3, the housing 4, and the bus bar assembly 6 in the course of the work.

First, the stator 2, the lower bearing 51, and the bus bar assembly 6 are placed in the housing main body 41. A first unit U1 including the housing main body 41, the stator 2, the bus bar assembly 6, and the lower bearing 51 is thus prepared (step S21). A second unit U2 including the bearing holder 42, the shield plate 43, the lead bushing 44, the rotor 3, and the upper bearing 52 is also prepared (step S22).

Next, the second unit U2 is moved axially downward toward the first unit U1 from axially above the first unit U1 (step S23; see arrow A1 in FIG. 17). Step S23 is carried out in a state in which a central axis 91 of the stator core 21 in the first unit U1 and a central axis 92 of the rotor 3 in the second unit U2 are misaligned. Specifically, the central axis 92 of the rotor 3 is shifted oppositely to the connection terminals 612 with respect to the central axis 91 of the stator core 21. The second unit U2 is thus lowered without contact of the rotor main body 32 with the upper terminal portions 612*c*.

When the rotor main body 32 is located axially above the stator core 21 and at a substantially identical height with the lower terminal portions 612*a*, then the second unit U2 is moved in a direction intersecting with the axial direction (step S24; see arrow A2 in FIG. 17). Specifically, the rotor main body 32 is moved in the direction of the lower terminal portions 612*a* at the same axial position as the lower terminal portions 612*a*. The central axis 92 of the rotor 3 is thus aligned with the central axis 91 of the stator core 21. In step S24, the second unit U2 may be moved in a direction perpendicular to the axial direction or in a direction diagonal to the axial direction.

Next, the second unit U2 is moved axially downward again (step S25; see arrow A3 in FIG. 17). The rotor main body 32 is thus inserted into the radially inner side of the stator core 21.

As described above, in the present example embodiment, the upper ends of the connection terminals 612 are located radially inside the stator core 21. However, each of the connection terminals 612 includes the lower terminal portion 612*a*, the bent portion 612*b*, and the upper terminal portion 612*c*, and thus has a bent or substantially bent shape. In the process of manufacturing the motor 1, therefore, the rotor main body 32 is inserted into the radially inner side of the stator core 21, using a space defined radially inside the lower terminal portions 612*a*.

Particularly in the present example embodiment, an axial length h1 from the upper end of the stator 2 to the upper ends of the lower terminal portions 612*a* is longer than an axial length h2 of the rotor main body 32. In step S24, therefore, the rotor main body 32 is inserted into the space defined radially inside the lower terminal portions 612*a* without being inclined.

As described above, the connection terminals 612 extend upward of the housing 4 through the lead bushing 44 made of a resin and disposed in the housing 4. This configuration thus achieves isolation of the connection terminals 612 from the housing 4.

Among the lower terminal portions 612*a*, bent portions 612*b*, and upper terminal portions 612*c* of the connection terminals 612, the lower terminal portions 612*a* and the bent portions 612*b* are located below the upper end of the lead bushing 44. If the bent portions 612*b* are located above the lead bushing 44, a slight angular difference among the bent portions 612*b* causes positional deviation of the upper ends of the connection terminals 612. It is therefore difficult to accurately position the upper ends of the connection terminals 612. According to the structure described in the present example embodiment, among the lower terminal portions 612a, bent portions 612b, and upper terminal portions 612c of the connection terminals 612, only the upper terminal portions 612c extend axially upward of the lead bushing 44. The upper ends of the connection terminals 612 are therefore accurately positioned with respect to the lead bushing 44. The upper ends of the connection terminals 612 are therefore accurately connected to the circuit board.

As illustrated in FIG. 2, the lower terminal portions 612a of the connection terminals 612 are disposed radially opposite the bearing holding portion 421 of the bearing holder 42. The lower terminal portions 612a are also disposed radially opposite the central recess 431b of the shield plate 43. If the entire connection terminals 612 are at the same radial position as the upper terminal portions 612c, a radial distance between the lower terminal portions 612a and the bearing holding portion 421 or the central recess 431b becomes narrow. In the present example embodiment, however, the lower terminal portions 612a are located radially outside the upper terminal portions 612c. This configuration therefore increases the radial distance between the lower terminal portions 612a and the bearing holding portion 421 or the central recess 431b. As a result, this configuration secures isolation of the lower terminal portions 612a from the bearing holding portion 421 or the central recess 431b.

Figure 18:
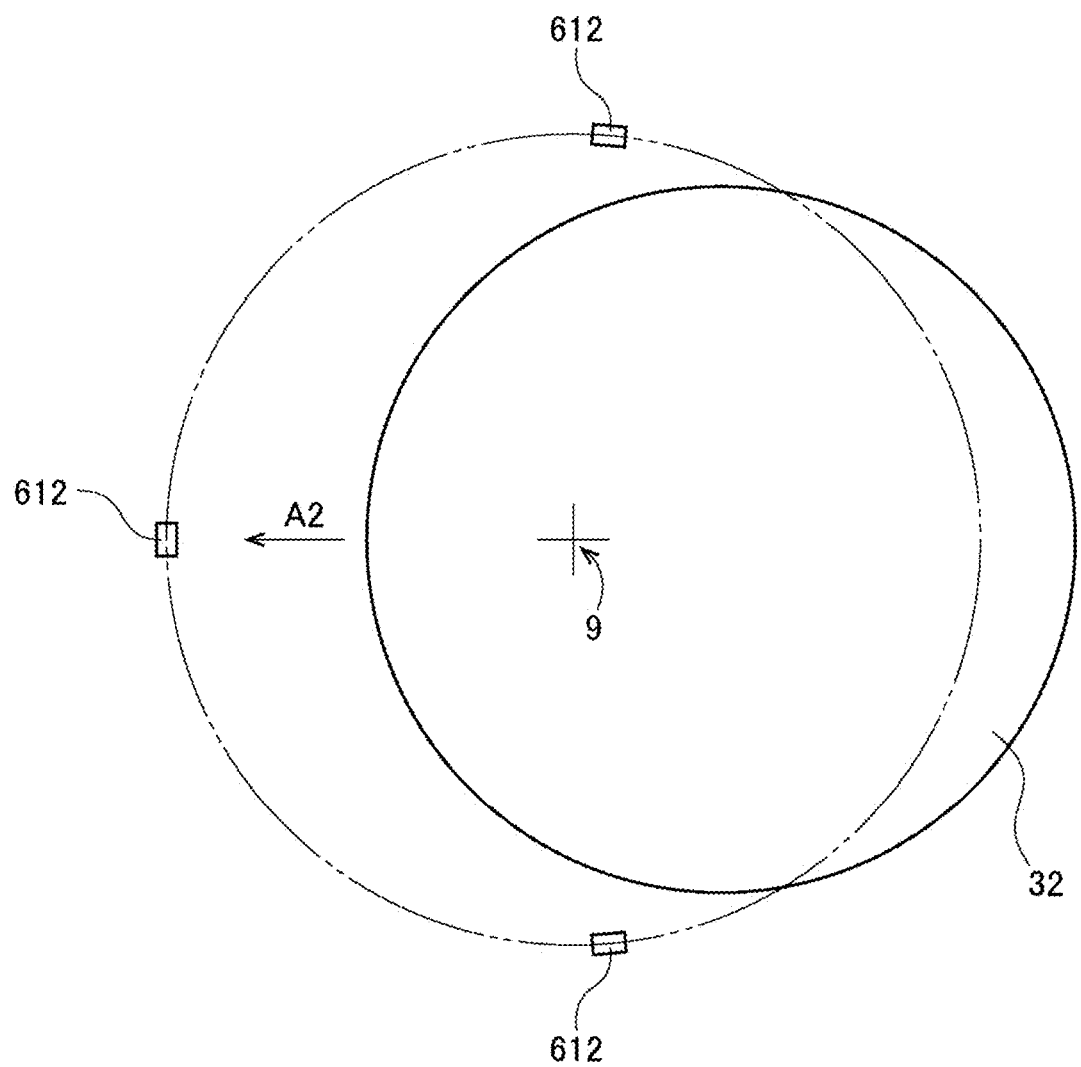
FIG. 18 is a schematic plan view of three connection terminals and a rotor main body.

The three connection terminals 612 are not necessarily arranged within the range of 180° about the central axis 9. FIG. 18 is a schematic plan view of the three connection terminals 612 and the rotor main body 32 in the case where the three connection terminals 612 are not arranged within the range of 180° about the central axis 9. In this case, the rotor main body 32 is moved between the most distant two of the three connection terminals 612, in a direction indicated by arrow A2 in step S24 described above.

The foregoing description concerns an example embodiment of the present disclosure; however, the present disclosure is not limited to the example embodiment.

In the foregoing example embodiment, the motor 1 includes the 12 coils 23. However, the motor 1 may include any number of coils 23. Also in the foregoing example embodiment, the bus bar assembly 6 includes the 12 weld portions 615. However, the bus bar assembly 6 may include any number of weld portions 615. In addition, the number of coils 23 may be different from the number of weld portions 615.

Also in the foregoing example embodiment, the housing main body 41 is a single member. However, the housing main body 41 may be constituted of a plurality of members. For example, the bottom plate 411 and the sidewall 412 may be separate members.

In addition, the specific shapes of the respective members constituting the motor may be different from the shapes illustrated in the respective drawings of this application. The respective elements described in the foregoing example embodiment and modification example may be appropriately sorted out within a range not departing from the scope of the present disclosure.

The present disclosure is applicable to a motor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a stator with a ring shape around a central axis extending up and down;
a rotor rotatably supported about the central axis; and
a housing accommodating the stator and the rotor;
wherein the rotor includes:
a shaft extending along the central axis; and
a rotor main body rotatable about the central axis in conjunction with the shaft;
the motor further comprising:
a bearing axially above the rotor main body;
the bearing supporting the shaft in a rotatable manner relative to the housing; and
a connection terminal electrically connected to a coil of the stator;
the housing includes:
a bearing holder axially partitioning an inner side and an outer side of the housing and holding the bearing; and
a lead bushing fixed to the bearing holder;
the bearing holder includes a first through-hole and a second through-hole;
the lead bushing includes:
a base located between the bearing holder and at least one of the stator and the rotor main body;
a first protrusion protruding axially upward from the base, the first protrusion being in the first through-hole; and
a second protrusion protruding axially upward from the base, the second protrusion being in the second through-hole;
the connection terminal extends from the inner side of the housing to the axially upper side and the outer side of the housing through the first protrusion; and
the second protrusion includes a diameter increased portion extending to the axially upper side and the outer side of the housing, extending outward from an upper end of the second protrusion, and closing an upper opening of the second through-hole.

2. The motor according to claim 1, wherein
the bearing holder includes a plurality of the second through-holes;
the lead bushing includes a plurality of the second protrusions equal in number to the plurality of the second through-holes; and
each of the second protrusions is in a respective one of the second through-holes.

3. The motor according to claim 2, wherein the first through-hole is located between a pair of the second through-holes.

4. The motor according to claim 1, wherein the base extends along a lower surface of the bearing holder, and closes a lower opening of the first through-hole and a lower opening of the second through-hole.

5. The motor according to claim 1, wherein
the first protrusion includes:
a lower protrusion protruding axially upward from the base, and including an outer peripheral surface fitted to an inner peripheral surface of the first through-hole; and
an upper protrusion protruding axially upward from the lower protrusion; and
the connection terminal extends from the inner side of the housing to the axially upper and outer side of the housing through the lower protrusion and the upper protrusion.

6. The motor according to claim 5, comprising:
a plurality of the connection terminals; wherein
the first protrusion includes a plurality of the upper protrusions; and
each of the connection terminals is in a respective one of the plurality of the upper protrusions.

\* \* \* \* \*